(12) United States Patent
Hoffmann et al.

(10) Patent No.: US 10,131,267 B2
(45) Date of Patent: Nov. 20, 2018

(54) METHOD FOR CALIBRATING A LIGHTING APPARATUS

(71) Applicant: HELLA KGaA Hueck & Co., Lippstadt (DE)

(72) Inventors: Ingo Hoffmann, Berlin (DE); Susanne Graf, Berlin (DE); Monika Hillenkamp, Berlin (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/643,890

(22) Filed: Jul. 7, 2017

(65) Prior Publication Data

US 2017/0305327 A1    Oct. 26, 2017

Related U.S. Application Data

(63) Continuation-in-part of application No. 15/060,962, filed on Mar. 4, 2016, now Pat. No. 9,732,927.

(30) Foreign Application Priority Data

Mar. 4, 2015   (DE) .................. 10 2015 203 889

(51) Int. Cl.
    *F21S 41/143*   (2018.01)
    *B60Q 1/064*    (2006.01)
    *H05B 33/08*    (2006.01)
    *F21S 41/63*    (2018.01)
    (Continued)

(52) U.S. Cl.
    CPC ............ *B60Q 1/064* (2013.01); *F21S 41/141* (2018.01); *F21S 41/63* (2018.01); *F21S 41/663* (2018.01); *H05B 33/0845* (2013.01); *B60Q 2200/38* (2013.01)

(58) Field of Classification Search
    CPC ............ H05B 33/0842; H05B 33/0869; H05B 37/02; H05B 37/029; H05B 33/0845; B60C 1/143; B60C 2200/38; B60C 2300/337; B60C 2300/41; B60C 2300/42; G01M 11/064; G01J 2001/444; G01J 3/10; F21S 48/1715; F21S 48/1154; F21S 48/1731; F21S 41/143; F21S 41/645; F21S 41/663
    See application file for complete search history.

(56) References Cited

U.S. PATENT DOCUMENTS

| 7,358,929 B2 | 4/2008 | Mueller et al. |
| 7,478,922 B2 | 1/2009 | Garbus, Jr. |
| 9,046,237 B2 | 6/2015 | Stefanov et al. |

(Continued)

FOREIGN PATENT DOCUMENTS

| DE | 10 2012 004 817 A1 | 9/2013 |
| DE | 10 2012 007 908 A1 | 10/2013 |

(Continued)

OTHER PUBLICATIONS

German Search Report, Application No. DE 10 2015 203 889.0, dated Dec. 9, 2015, 8 pgs.

(Continued)

*Primary Examiner* — Haissa Philogene
(74) *Attorney, Agent, or Firm* — Paul D. Strain, Esq.; Strain & Strain PLLC

(57) ABSTRACT

The invention relates to a method for calibrating a lighting apparatus, particularly lighting apparatus for a motor vehicle.

6 Claims, 21 Drawing Sheets

(51) Int. Cl.
*F21S 41/141* (2018.01)
*F21S 41/663* (2018.01)

(56) References Cited

U.S. PATENT DOCUMENTS

| | | |
|---|---|---|
| 9,061,631 B2 | 6/2015 | Totzauer |
| 9,261,428 B2 | 2/2016 | Hoffmann |
| 9,732,927 B2 * | 8/2017 | Hoffmann .............. F21S 41/143 |
| 9,809,154 B2 * | 11/2017 | Funk ...................... B60Q 1/143 |
| 2012/0206050 A1 | 8/2012 | Spero |
| 2016/0257241 A1 | 9/2016 | Hoffmann |

FOREIGN PATENT DOCUMENTS

| | | |
|---|---|---|
| DE | 10 2012 022 282 A1 | 5/2014 |
| DE | 10 2013 201 876 A1 | 8/2014 |

OTHER PUBLICATIONS

Hoffmann; U.S. PTO Office Action, U.S. Appl. No. 15/060,962, dated Sep. 29, 2016, 6 pgs.
Hoffmann; U.S. PTO Notice of Allowance, U.S. Appl. No. 15/060,962, dated Apr. 7, 2017, 9 pgs.

* cited by examiner

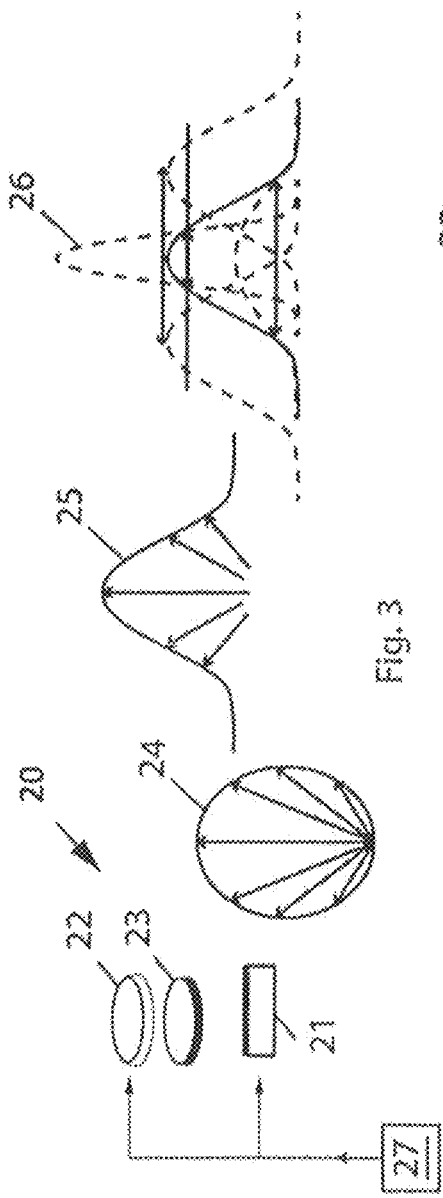
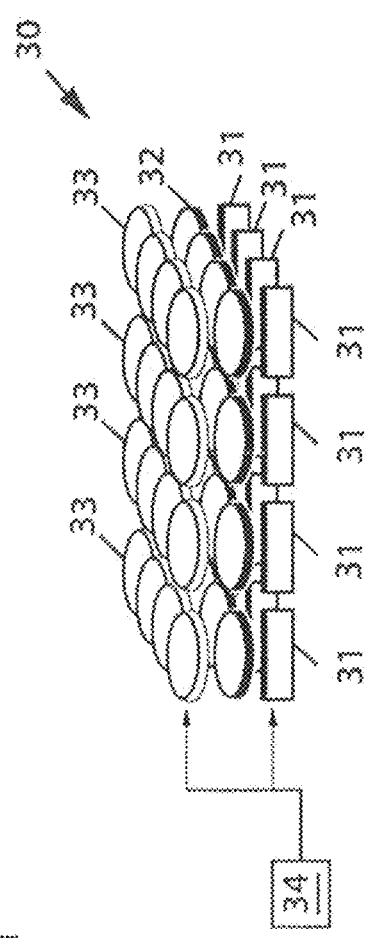
Fig. 3
Fig. 4

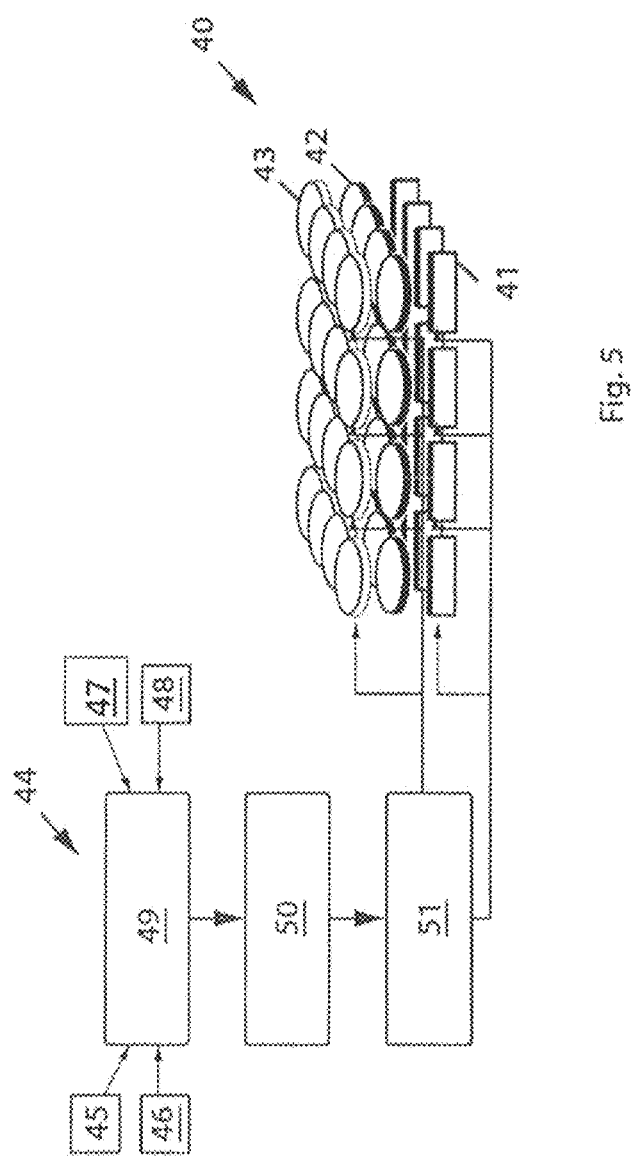

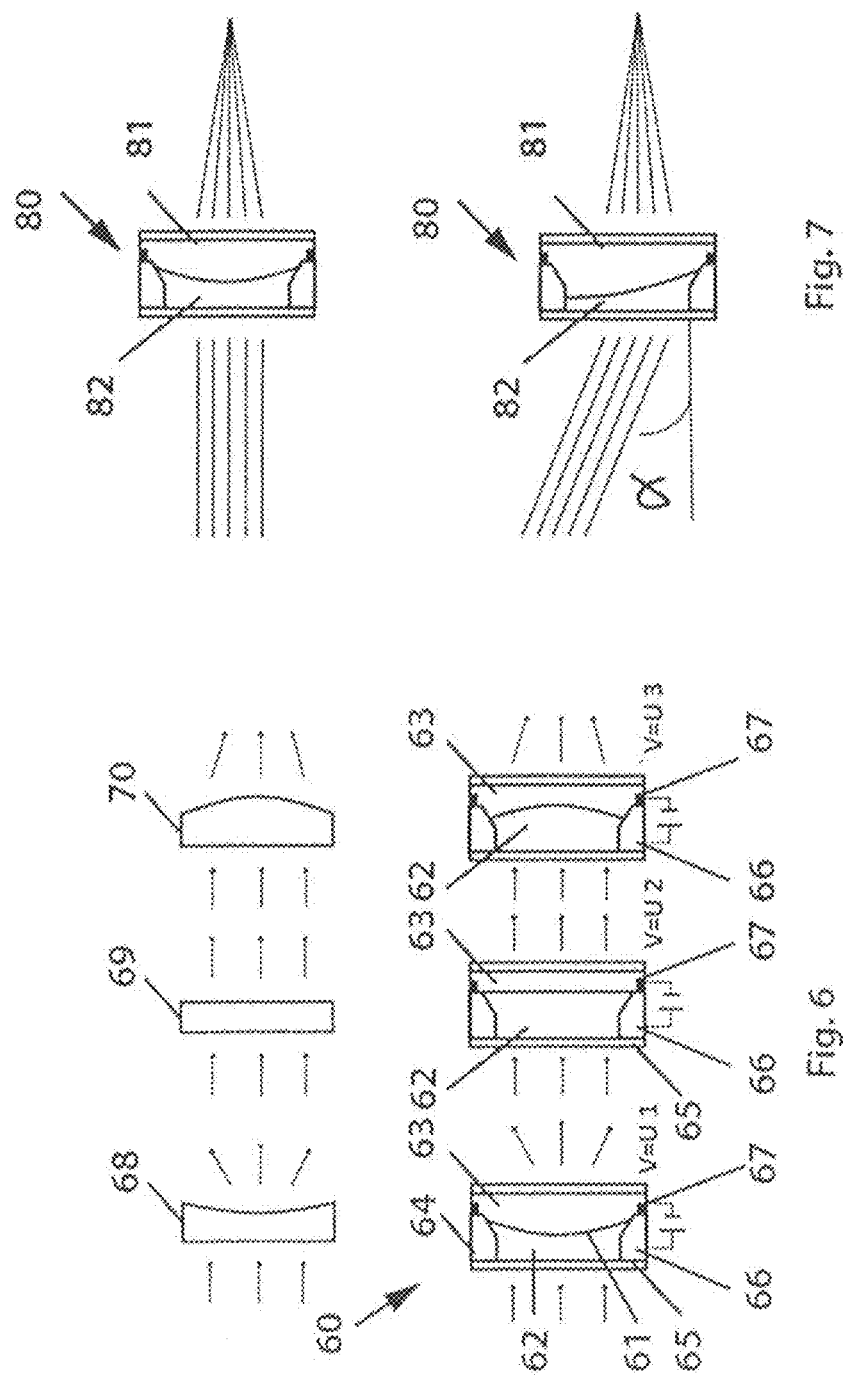

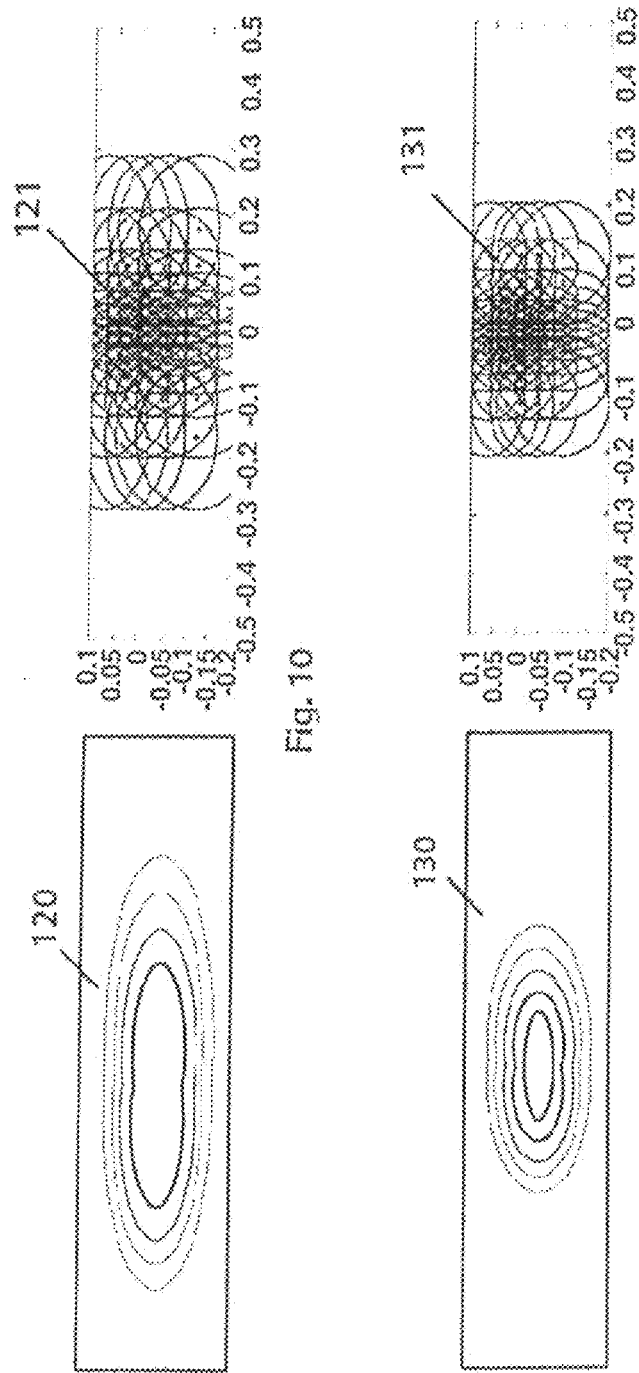

METHOD FOR CALIBRATING A LIGHTING APPARATUS

CROSS-REFERENCE TO RELATED PATENT APPLICATIONS

This application is a Continuation-In-Part of U.S. application Ser. No. 15/060,962, filed Mar. 4, 2016, which is based upon and claims the benefit of priority from prior German Patent Application No. 10 2015 203 889.0, filed Mar. 4, 2015, the entire contents of all of which are incorporated herein by reference in their entirety.

TECHNICAL FIELD

The invention relates to a method for calibrating a lighting apparatus, particularly a lighting apparatus for a motor vehicle.

PRIOR ART

Lighting apparatuses have become known as headlamps for motor vehicles, for example, which are arranged on the front of a vehicle and can produce different lighting variants. Thus, headlamps can produce a parking light, a low beam or a high beam, which is used to light the region or the roadway in front of the motor vehicle.

In this case, headlamps each having a fixed illuminant as light source for the respective light are known. These headlamps are not adjustable to the respective traffic situation. Headlamps having a swivelable illuminant or having an associated optical system have also become known that are swivelable as cornering lights for cornering, for example. In this case, the light intensity of the respective illuminant is not adjustable to suit the traffic situation, however.

Furthermore, headlamps having an adaptive bright/dark boundary have become known. In this case, the light distributions are produced by resorting to data from the vehicle surroundings. A camera detects oncoming vehicles and vehicles ahead, for example a stepping motor is used to rotate a cylinder, for example in what is known as a VarioX module, into the required position within a few milliseconds. This has the advantage that it allows the beam of light to end directly in front of the oncoming vehicles or behind the vehicles ahead.

Furthermore, a dazzle-free full beam has become known. In this case, the automobile driver drives on full beam continuously. When the camera provided detects other road users, they are cut out of the full beam distribution, for example in the form of a tunnel, using vertical bright/dark boundaries. The number of tunnels is limited in this case, however, on the basis of the design.

In addition, LED matrix headlamps have become known, in which a matrix of controlled-intensity LED elements is provided, with individual fixed matrix elements being disconnectable or connectable in order to produce the parking light, the low beam, the daytime running light, the high beam and/or multiple horizontal and/or vertical bright/dark boundaries, particularly to form tunnels. In this case, the emitted light is adjusted to suit the respective traffic situation only to a limited extent, however, by dint of LED matrix elements being disconnected and connected. The number of tunnels that can be produced is dependent on the number of LED elements provided. As a result, the emitted light is variable only to a limited extent. In this case, the LED elements each light solid angle ranges of their own without overlap or with only slight overlap. In order to be able to produce a largely homogeneous light distribution and a required number of bright/dark boundaries, there is furthermore a need for a large number of LED elements, which results in a high level of production complexity and in high susceptibility to error. Furthermore, cornering lights may require further light sources to be arranged in the lateral regions of the vehicle.

LCD matrix headlamps have also become known, in which LCD elements are used to produce backlighting, this backlighting needing to be suitably attenuated in order to obtain a desired light distribution. This means that power in the order of magnitude of 70% or more needs to be eliminated because, of the 100% of the amount of light produced, approximately 70% needs to be eliminated again in order to achieve the desired light distribution.

The trend is therefore moving toward more automation and toward better lighting of the region or of the roadway in front of the motor vehicle, because this achieves improved comfort and an increase in safety. Lighting adjusted to suit traffic conditions can also be used to achieve improved energy efficiency.

In this case, the calibration of the lighting apparatus is important so that the lighting apparatus produces a defined light distribution.

Calibration of a headlamp has been disclosed by DE 10 2010 006 190 A1, for example, in which a horizontal or vertical position for a light distribution is used in order to provide a driver of the motor vehicle with a notification message to prompt adjustment.

DE 10 2013 201 876 A1 has likewise disclosed a method for calibrating a headlamp, in which a bright/dark boundary for a light distribution is utilized.

However, these methods relate only to the overall light distribution of a headlamp and are unsuitable for calibrating single lighting elements.

PRESENTATION OF THE INVENTION, PROBLEM, SOLUTION AND ADVANTAGES

It is therefore the object of the invention to provide a method for calibrating a lighting apparatus that is simple to implement but nevertheless achieves safe calibration of the lighting apparatus.

In addition, it is also an object of the present invention to provide a method for actuating a lighting apparatus that correctly produces prescribable light distributions during operation directly after production and as its life progresses.

In addition, it is the object to provide a control apparatus that can be used to perform at least one of the two aforementioned methods.

The object according to the invention in relation to the calibration method is achieved by means of the features of Claim 1.

An exemplary embodiment of the invention relates to a method for calibrating a lighting apparatus, wherein the lighting apparatus has a plurality of illuminants as light sources that each produce an individual light distribution, control means for controlling the settings of the individual light distributions to produce a superimposed overall light distribution by dint of superimposition of the individual light distributions of at least single illuminants, additionally characterized by the production of an essentially overlap-free distribution of the individual light distributions of at least single selected illuminants, pickup of the light distribution of the selected illuminants by means of a sensor, determination of at least one characteristic of the picked-up individual light distributions of the selected illuminants, calibration of the lighting apparatus on the basis of a comparison of the at least one characteristic of different illuminants among one another and/or with prescribable setpoint data.

As a result, it is possible to ensure that, for example at the end of production or assembly of the lighting apparatus or possibly even over the life of the lighting apparatus, the illuminants are calibrated, so that lighting by the lighting apparatus does not result in disturbing effects and possibly disturb other road users.

The object according to the invention in relation to the method for actuating the lighting apparatus is achieved by means of the features of Claim 2.

An exemplary embodiment of the invention relates to a method for actuating a lighting apparatus, wherein the lighting apparatus has a plurality of illuminants as light sources that each produce an individual light distribution, having control means for controlling the settings of the individual light distributions to produce a superimposed overall light distribution by dint of superimposition of the individual light distributions of at least single illuminants, additionally characterized by the production of an essentially overlap-free distribution of the individual light distributions of at least single selected illuminants at a selected time, pickup of the light distribution of the selected illuminants by means of a sensor, determination and storage of at least one characteristic of the picked-up individual light distributions of the selected illuminants, actuation of the lighting apparatus during operation based on the at least one characteristic.

As a result, it is possible to ensure that, even with tolerances in production and alterations during operation, prescribable light distributions are correctly producible. These tolerances can relate to all adjustable properties of the lighting elements. In this case, the characteristic is advantageously chosen such that at least one adjustable property of the lighting elements can be derived therefrom. In particular, it is advantageous if these are directly selectable and/or adjustable properties of the illuminants.

An overlap-free distribution can be produced by dint of deactivation of the unselected illuminants and/or by dint of adjustment of the setting of the at least single selected illuminants.

It is particularly advantageous if the actuation involves a setpoint value for the characteristic being compared with the actual value and the difference being used for control. As a result, it is possible for control of the lighting apparatus to be performed directly on the basis of the headlamp properties without the need for conversion from calibration data to take place.

In addition, it is advantageous if the illuminants are provided with means for setting the direction of radiation of the individual light distribution and/or with means for setting the focusing of the individual light distribution. As a result, the illuminants are particularly adjustable and can therefore be calibrated and/or actuated particularly well. Thus, prescribable light distributions can be correctly set despite incorrectly set individual light distributions in comparison with the initial setting, particularly the orientation and focusing. In addition, it is thus also possible to use the setting of the direction of radiation and/or the focusing of the individual light distribution of the individual light distribution to perform setting for overlap-free distribution in order to be able to perform the calibration.

In this case, it is particularly advantageous if the illuminants are in a form such that the intensity of the individual light distribution is adjustable, the respective intensity of the individual light distribution of the illuminants being controllable by the control means. Thus, it is also possible to use the setting of the intensity of the individual light distribution to perform setting for overlap-free distribution in order to be able to perform the calibration.

In addition, the adjustability of the illuminants can be increased further thereby, which means that the individual light distributions of the illuminants can thus be combined more flexibly, taking account of existing adjustments, to produce a superimposed overall light distribution.

It is also advantageous if the calibration of the lighting apparatus is setting and/or the actuation is control of the direction of radiation of the individual light distribution from at least one illuminant or all illuminants and/or of the focusing of the individual light distribution from at least one illuminant and/or from all illuminants and/or of the intensity of the individual light distribution from at least one illuminant or from all illuminants. Thus, it is possible for at least one illuminant, particularly some or all illuminants, to be calibrated. The effect achieved by this is that the setting of the at least one illuminant or of all illuminants can be performed such that said illuminant or said illuminants produces or produce an individual light distribution that corresponds to the setpoint values. These may be initial setpoint values and/or setpoint values that are needed at this time on the basis of the situation.

It is also advantageous if the calibration of the lighting apparatus is setting and/or the actuation is control of the direction of radiation of the individual light distribution from at least one of the selected illuminants or all selected illuminants and/or of the focusing of the individual light distribution from at least one of the selected illuminants and/or from all selected illuminants and/or of the intensity of the individual light distribution from at least one of the selected illuminants or from all selected illuminants. Thus, it is advantageously possible for selected illuminants to be calibrated. The effect achieved by this is that the setting of the selected illuminants can be performed such that they produce an individual light distribution that corresponds to the setpoint values.

In this case, it is particularly advantageous if the characteristic is a center or focus of an individual light distribution. In this case, it is possible for this characteristic to be advantageously ascertained simply in the data, particularly the image, and/or in a data sequence, particularly the image sequence from the sensor, when said characteristic is typically the maximum in the intensity, or it is possible for it to be determined from the geometric circumstances of the individual light distribution. In this case, particularly the position of the centers can be ascertained and evaluated.

It is also advantageous if the characteristic is an expansion and/or a profile of the light distribution. This expansion and/or profile can likewise be determined, optically or geometrically, in the data, particularly the image, and/or in a data sequence, particularly the image sequence from the sensor, and evaluated as appropriate. In this case, it is particularly possible for a magnitude to be determined. In addition, it is possible to ascertain and evaluate an expansion in different directions, particularly horizontally and/or vertically.

It is also advantageous if the comparison is a comparison of centers and/or expansion parameters and/or profile parameters from light distributions that are ascertained from different illuminants. These can also be determined optically or geometrically and evaluated as appropriate.

In this case, the position of the individual centers and/or focuses in comparison with the position of other centers and/or threshold values can be used to ascertain an alteration in the orientation in comparison with the correct orientation, particularly as a difference. The alteration can be used to calibrate and/or to actuate the lighting apparatus.

In addition, the magnitude of the individual expansion in comparison with other magnitudes can be used to ascertain an alteration in the focusing in comparison with the correct focusing, particularly as a difference. The alteration can be used to calibrate and/or to actuate the lighting apparatus.

In addition, it is advantageous to ascertain and compare the expansion in different directions, and in particular it is possible to ascertain and compare a horizontal expansion and a vertical expansion. The dimension of the difference can be used to ascertain an altered orientation.

It is particularly advantageous if the comparison is used to examine at least one regularity. This may be a regularity particularly in relation to the arrangement of the centers, in relation to the magnitude of the expansion or in relation to a combination of the position and the magnitude. To examine the regularity, it is particularly advantageously possible for the distance from adjacent centers to be ascertained and compared. In addition, it is advantageous to determine the regularity in relation to predetermined axes of symmetry or points by evaluating a symmetry for the characteristics. In particular, in the case of a matrix arrangement, a regularity can be examined by checking a row-by-row and/or column-by-column arrangement and/or a formation of the actual values of the characteristics that is consistent at least on a region-by-region basis.

In addition, it is expedient if the comparison is a comparison of centers and/or expansion parameters and/or profile parameters from light distributions that are compared with setpoint positions, setpoint expansions and/or setpoint profiles. In this case, it is possible for a difference between a setpoint value and an actual value to be ascertained, so that the ascertained discrepancy can be established and can be reduced by dint of appropriate correction through actuation of the illuminant.

In this case, particularly the position of the individual centers and/or focuses in comparison with setpoint positions for the centers and/or threshold values can be used to ascertain an alteration in the orientation in comparison with the setpoint orientation, particularly as a difference. The alteration can be used to calibrate and/or to actuate the lighting apparatus.

In addition, the magnitude of the individual expansion in relation to setpoint magnitudes illuminants can be used to ascertain an alteration in the focusing in comparison with the setpoint focusing, particularly as a difference. The alteration can be used to calibrate and/or to actuate the lighting apparatus.

In addition, it is advantageous to ascertain the expansion in different directions and to compare it with setpoint values; in particular, it is possible to ascertain a horizontal expansion and a vertical expansion and to compare them with setpoint values. The dimension of the difference can be used to ascertain an altered orientation, which can be used to calibrate and/or to actuate the lighting apparatus.

In this case, it is particularly advantageous if the production of an essentially overlap-free distribution of the individual light distributions is performed over an area in front of the vehicle. As a result, the resultant overall light distribution from the individual light distributions can be produced particularly without distortion and picked up by a sensor, such as a camera or the like, and evaluated by a control unit. Alternatively, range data, which are obtained by rangefinding, are used to compute a distortion-free overall light distribution. In addition, it is possible for a resultant distortion to be compensated for when the illuminants are actually actuated, so that a distortion-free overall light distribution and/or distortion-free individual light distributions can be produced even on uneven ground.

In this case, it is particularly advantageous if the area is an at least essentially even area that has a horizontal or vertical profile, in particular. As a result, a distortion-free overall light distribution is produced that can also be safely picked up by a sensor. Alternatively, range data, which are obtained by rangefinding, are used to compute a horizontally and/or vertically distortion-free overall light distribution. In addition, it is possible for a resultant horizontal and/or vertical distortion to be compensated for when the illuminants are actually actuated, so that a distortion-free overall light distribution and/or distortion-free individual light distributions can be produced even on areas that have a nonhorizontal and/or nonvertical profile, particularly that are tilted or sloping.

In this case, it is also advantageous if the area is a selected area or is a subregion of a selected area in which the operation of the headlamp is essentially unimpaired and/or the driver of the vehicle and/or other road users are not disturbed or influenced. Thus, the area may be an area in front of the vehicle that may not be identifiable to the driver during normal operation or that may not be lit during normal operation. As a result, an area would be used for the calibration that would not normally be used, which would also have the advantage of producing no irritations in the process, because the visually identifiable element of the calibration does not come into a region that is important.

It is also advantageous if the area is not visible to the driver of the vehicle. As a result, the driver is advantageously also not influenced, which means that he would also not be distracted from the current traffic, for example.

It is also expedient if the method for calibration is performed cyclically in multiple calibration cycles. Thus, the calibration of the lighting apparatus and/or the ascertainment of the control parameter can be performed in steps. In this case, the process of calibrating the lighting apparatus can be performed repeatedly in cycles in order to be able to check the calibration repeatedly.

It is also advantageous if the method for calibration is performed such that only a portion of the illuminants of the lighting apparatus are calibrated in a calibration cycle, different calibration cycles involving accordingly different portions of the illuminants being calibrated. The effect that can be achieved by this is that after a number of calibration cycles, the calibration has been performed completely and can begin again in the subsequent calibration cycle.

In this case, it is accordingly advantageous if after a complete pass through the calibration cycles, essentially all illuminants are calibrated. As a result, after such a complete calibration cycle, it is possible to ensure that the whole lighting apparatus has been calibrated.

It is also expedient if the selected illuminants for calibration are selected such that they are currently not used to produce a light distribution that is needed on account of the situation, particularly on account of function or traffic, or such illuminants are used but they are at least intermittently replaced by other illuminants. It is thus possible to perform calibration without disturbing the current overall light distribution that is needed for the current operating situation. In the case of the first alternative, only the illuminants that are currently not needed are calibrated. In the other alternative, even illuminants that are currently used are calibrated, the lighting function of these illuminants being replaced at least briefly by that of other illuminants.

It is also advantageous if only one individual light distribution for an illuminant at a time is calibrated in a calibration cycle. The effect achieved by this is that when the illuminant to be calibrated is currently used, the disturbance to the overall light distribution is kept small if this illuminant is actuated otherwise for calibration. This also simplifies the calibration process if, in this case, the other illuminants are switched off or have had their intensity reduced.

It is particularly advantageous if the production of the overlap-free distribution of the individual light distributions is performed in at least one of various settings for the illuminants. As a result, the illuminant can advantageously be calibrated to a particular setting. Alternatively, the calibration can also be performed in different settings of an illuminant, for example in succession, in order to improve the quality of the calibration.

In this case, it is advantageous if the setting that is set is a central position, a, in particular extreme, swivel position, a, in particular extreme, focusing and/or an, in particular extreme, expansion. As a result, the calibration can be performed in particularly easily adjustable and identifiable settings, which improves the quality of the calibration.

It is also possible for the calibration to be performed not only when the setting of the individual light distribution is constant over time, but rather it can alternatively also be performed when a dynamic setting for the individual light distribution or for the light distributions is performed.

It is thus possible for swiveling and/or circling and/or expansion and contraction of the individual light distributions to be set. As a result, it is possible to assess not only the absolute position but also the dynamics of the setting of the individual light distributions.

It is particularly advantageous if the calibration of a lighting apparatus and/or the ascertainment of control parameters for a motor vehicle is performed, the calibration and/or the ascertainment of control parameters being performed when the motor vehicle is at a standstill. By way of example, this can be performed during the production or assembly of the lighting apparatus or of a motor vehicle, in a workshop, garage, etc., and, in so being, can advantageously be initiated in automated fashion or manually.

It is also advantageous if the calibration and/or the ascertainment of control parameters for a lighting apparatus of a motor vehicle is performed, the calibration and/or the ascertainment of control parameters being performed during a driving situation of the motor vehicle. In this case, it is particularly advantageous if the calibration and/or the ascertainment of control parameters are performed without disturbing the functionality of the lighting apparatus for the current operating or traffic situation. Particularly when not all illuminants are needed for producing the overall light distribution, when there is currently no traffic situation classified as critical and/or when there is notification of a miscalibration by the driver, another road user and/or by a camera-based function check.

It is also additionally advantageous if a comparison is followed by a discrepancy in an individual light distribution for a selected illuminant from a setpoint value being established, from which a correction value for actuating the selected illuminant is determined, so that the discrepancy is reduced. As a result, identification of the discrepancy is followed by the initiation of a control measure that is used to correct the setting.

If the setting cannot be corrected because there is a fault relating thereto, it may also be advantageous if the illuminant is shut down and instead a different illuminant is actuated such that it undertakes the function of the illuminant that has been shut down.

In addition, it is also advantageous if the correction value or the alternative actuation is stored and is used or taken into account during operation of the illuminant.

In a method according to the invention, it is also advantageous if calibration involves a first pattern being produced and/or projected from the individual light distributions, in which the individual light distributions do not overlap.

This means that the production of an essentially overlap-free distribution of the individual light distributions of at least some selected illuminants is effected on the basis of a prescribed schema, so that a previously defined overlap-free setpoint pattern emerges or is projected as an actual pattern in the form of a light distribution.

Subsequently, pickup of the light distribution of the selected illuminants, that is to say of the overall light distribution produced for the calibration, by means of a sensor produces a digital map of the actual pattern.

In this map, that is to say of the picked-up individual light distributions, arranged in accordance with the actual pattern, of selected illuminants, it is subsequently possible, in accordance with the invention, to determine a characteristic. Alternatively or additionally, the actually produced pattern can be compared with the previously defined setpoint pattern. Alternatively or additionally, a characteristic can be ascertained that is used to ascertain the comparison between the actual pattern and the previously defined setpoint pattern. On the basis of the comparison, the calibration of the lighting apparatus is subsequently performed. Alternatively, a comparison of the at least one characteristic of different illuminants among one another can be taken as a basis for effecting a calibration.

In this case, the characteristic can be obtained particularly from the (actual) pattern arrangement and be checked for the setpoint-pattern-based characterization.

In particular, characteristics of the setpoint shape of the individual light distributions can be used for a calibration. The setpoint shape is in this case a shape configured approximately in line with the individuality of the light. Characteristics of the shape may be mathematical objects such as corners, edges, curves or centres.

Additionally or alternatively, it is also possible to use representations such as a filtered image, for example, that are adjusted from the portrayal of the pattern-like light distribution using image processing means in order to determine the at least one characteristic and/or for comparison with the setpoint data.

In addition, it is advantageous if calibration involves at least one second pattern being produced and/or projected from the individual light distributions, in which the individual light distributions do not overlap.

It is particularly advantageous if the second pattern is a complementary pattern for the first pattern. That is to say that if it is light at one point, it is dark at another, and vice versa.

In this case, it is also particularly advantageous if a change between the first pattern and the second pattern, and vice versa, takes place at a prescribable frequency. The alternating projection of the two patterns allows the determination of characteristic points to be simplified. In this case, the frequency may be so high that the change is imperceptible to the naked eye.

It is also advantageous if the first pattern and/or the second pattern is a regular pattern. This typically allows multiple characteristic points to be produced that can be identified. This improves the calibration.

It is also possible to use representations such as a difference image or a contrast image produced therefrom or a filtered image, for example, that are adjusted from multiple portrayals of the pattern-like light distribution using image processing means in order to determine the at least one characteristic and/or for comparison with the setpoint data.

In addition, it is possible to use means for background suppression. The aim in this case is to find exclusively characteristic points in the light distribution and none that are conditional upon the background. The means used for background suppression may be multiple portrayals of different light distributions, and constant structures therein can be masked out. In particular, this can be effected by producing a difference image.

In addition, it is particularly advantageous to produce the difference image from two complementary patterns. In this way, the overall light distribution in an image can be examined and characteristics or characteristic features such as points, in particular, are detected that allow conclusions to be drawn as to the shape and arrangement of the individual light distributions.

Further advantageous embodiments are described by the description of the figures that follows and by the subclaims.

BRIEF DESCRIPTION OF THE DRAWINGS

The invention is explained in more detail below on the basis of at least one exemplary embodiment with reference to the figures of the drawing, in which:

FIG. 3 shows a schematic illustration of an example of a lighting apparatus, FIG. 4 shows a schematic illustration of a further example of a lighting apparatus, FIG. 5 shows a schematic illustration of a further example of a lighting apparatus, FIG. 6 shows illustrations to explain a liquid lens arrangement, FIG. 7 shows illustrations to explain a liquid lens arrangement, FIG. 10 shows an illustration of a further example of an overall light distribution that arises from a superimposition of individual light distributions, FIG. 11 shows an illustration of a further example of an overall light distribution that arises from a superimposition of individual light distributions.

PREFERRED EMBODIMENT OF THE INVENTION

Figure 1:
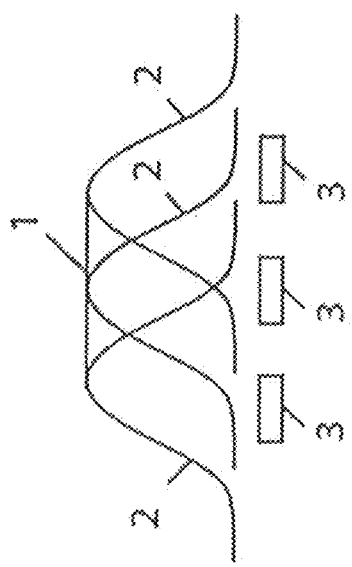
FIG. 1 shows a schematic illustration of an example of an overall light distribution.

FIG. 1 shows a two-dimensional view of an overall light distribution 1 that is obtained from three individual light distributions from two single illuminants 3. In this case, the intensity profile the individual light distributions 2 from the illuminants 3 is in the form of a Gaussian curve by way of example, so that the superimposition of the individual light distributions 2 results in an overall light distribution 1 that is flat in the central region.

Figure 2:
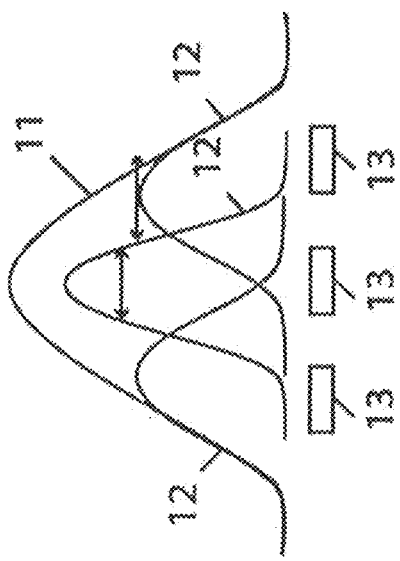
FIG. 2 shows a schematic illustration of a further example of an overall light distribution.

FIG. 2 shows a further example of an overall light distribution 11 in a two-dimensional illustration, in which the overall light distribution 11 is produced by three individual light distributions 12. The individual light distributions result from the illuminants 13. The individual light distributions 12 are set such that the two outer individual light distributions have a lower intensity but broader focusing than the central individual light distribution 12, which exhibits a higher intensity but narrower focusing. This results in an essentially Gaussian overall light distribution.

The left-hand part of the image in FIG. 3 shows an arrangement for a lighting apparatus 20 having an illuminant 21 and having means for setting the direction of radiation of the individual light distribution from the illuminant 21 and having means for setting the focusing of the individual light distribution from the illuminant 21, the means for setting the direction of radiation and the means for setting the focusing being formed by a liquid lens element 22 that forms the means for setting the direction of radiation and the means for setting the focusing. Provided between the liquid lens element 22 and the illuminant 21 is a primary optical element 23 that is used to take the general light distribution 24 from the illuminant 21 and produce an adjusted light distribution 25 that is then set by the liquid lens element 22 to produce a scalable individual light distribution 26. In this case, the adjusted light distribution 25 can correspond to a Gaussian curve, for example, but other distributions are likewise possible. In this case, the liquid lens element 22 and the illuminant 21 are preferably actuatable by a control means 27 in order to be able to set the intensity of the individual light distribution and/or to be able to set the direction of radiation of the individual light distribution and/or to be able to select the focusing of the individual light distribution.

FIG. 4 shows a lighting apparatus 30 according to the invention that has a multiplicity of illuminants 31 arranged in rows and columns. In this case, the illuminants 31 are arranged as a matrix, a 4×4 arrangement having been chosen in the exemplary embodiment shown. Alternatively, it is also possible for a different arrangement to be provided, as is also shown in the figures that follow, for example. In addition, it may correspond to a linear arrangement or to a matrix arrangement provided with gaps, and also to a different pattern. The illuminants 31 each have an associated primary optical system 32 and an associated liquid lens arrangement 33. The illuminants 31 and the liquid lens arrangements are preferably actuatable via the control means 34.

A lighting apparatus 30 as shown in FIG. 4 can perform selection of the individual light distributions of the illuminants 31 in accordance with the situation and/or traffic to produce a resultant overall light distribution that is dynamically selectable in accordance with the ambient situation, the situation concerning driving style and/or the traffic situation.

FIG. 5 shows an alternative lighting apparatus 40 having a matrix arrangement of illuminants 41, primary optical systems 42 associated with each of the latter and liquid lens arrangements 43. The illuminants and the liquid lens arrangements are actuated via control means 44 in order to be able to set the direction of radiation of the individual light distributions of the illuminants and/or the focusing of the individual light distributions of the illuminants and/or the intensity of the individual light distributions of the illuminants. To this end, the control means 44 receives sensor data 45 and/or vehicle data and possibly driver inputs 46 and also possibly a set of light distributions 47 and a computation code 48 for determining the light distributions. In block 49, a decision about the desired light distribution is made within the control means, by the computation for the setpoint data for the actuation of the illuminants being determined in block 50 and the actuation of the illuminants 41 and of the liquid lens arrangements 43 being performed in block 51.

The actuation of the illuminants 41 involves the intensity, angle relative to two planes and two focus values per illuminant 41 being set.

The actuation of the liquid lens arrangement 43 involves the direction of radiation, for example as an angle relative to two planes, and/or the focusing, for example as two focus values per liquid lens arrangement 43, being set. In addition, the intensity of the illuminants 41 can be set using an intensity value.

In another variant embodiment, it is also possible for different control parameters to be selected. The parameters are obtained from an adapted light distribution that is varied from a three-dimensional basic distribution on the basis of selected altered basic parameters and, as a result, can be adjusted to suit the current traffic situation. This adaptive light distribution is then implemented as a setpoint distribution as closely as possible by the headlamp. This is accomplished by adjusting the control parameters.

FIGS. 6 and 7 show a schematic illustration of the operation of liquid lens arrangements. Such a liquid lens arrangement has two fluids 62, 63 that are arranged adjacent to one another in an axial direction, are separated by a flexible wall 61 and have different optical refractive indices. The fluids are arranged in a housing 64 that is typically in the form of an annular housing and that is closed off in the axial direction by optically transmissive plates. The perimeter has electrodes 66, 67 in a distributed arrangement on it in order to produce an electrical voltage between the electrodes in order to control the behavior of the fluids. Thus, in the left-hand part of the image in FIG. 6, a voltage U1 of 30 volts, for example, is applied between the electrodes 66, 67, so that the fluid 62 is in the form of a concave lens, so that the optical equivalent circuit diagram 68 is embodied as a concave lens. In the central region of FIG. 6, a voltage U2 of 45 volts, for example, is applied between the electrodes 66, 67, so that the interface between the fluids 62, 63 is planar, so that a planar lens is produced whose equivalent circuit diagram is in the form of a planar lens 69. Accordingly, increasing the voltage between the plano-convex lens 68 produces the transition to a planar lens 69. If the voltage is increased further, as can be seen in the right-hand part of FIG. 6, in which a voltage U3 of 60 volts, for example, is applied, then a plano-convex lens is produced between the fluids 62, 63, so that the equivalent circuit diagram yields a plano-convex lens 70. Control can also involve the use of other voltage values. By way of example, it is thus also possible, depending on the embodiment of the liquid lens arrangement, for the behavior of the lens to be controlled from a plano-concave lens to a plano-convex lens by reducing the voltage, for example.

It can be seen that simple electrical or electronic actuation of the liquid lens arrangement 60 allows control from a plano-concave lens through to a plano-convex lens. As a result, different focusings can be made possible. If the voltage is then not arranged in a manner evenly distributed over the perimeter, but rather is also modulated over the perimeter, then FIG. 7 also allows the direction of radiation to be controlled.

FIG. 7 reveals a liquid lens arrangement 80, and in the left-hand part of the image the control of the fluids 81, 82 is in a form such that the control is evenly distributed over the perimeter, so that the direction of radiation is not tilted in relation to the liquid lens arrangement in comparison with the vertical directions. In the right-hand part of the image, the actuation of the fluids is modulated in a manner distributed over the perimeter, so that the direction of radiation is tilted by the angle α in comparison with the straight direction. In this case, depending on the actuation of the applied voltage, in a manner distributed over the perimeter, essentially any direction of radiation can be selected.

Figure 8:
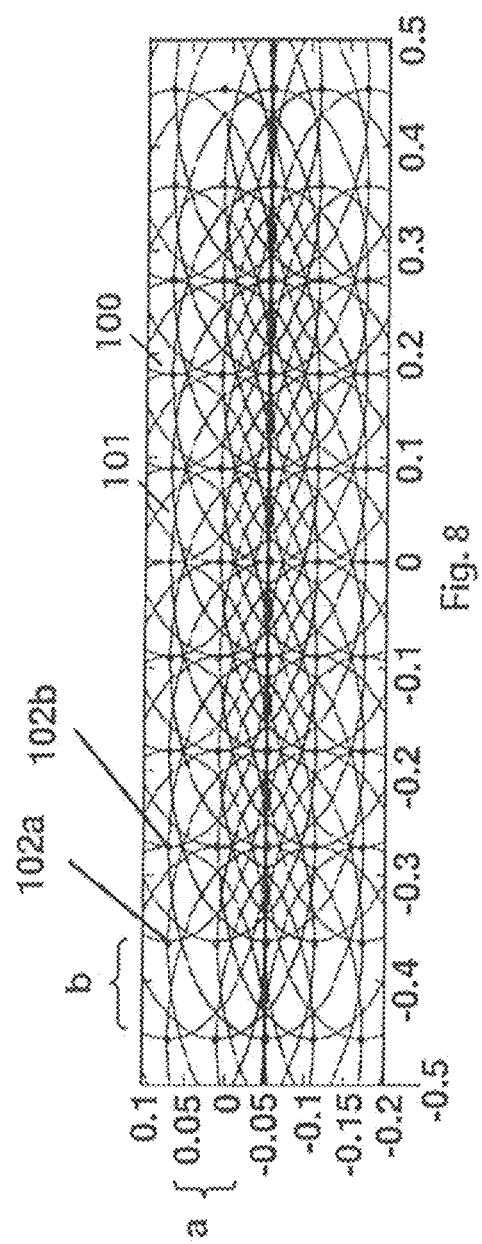
FIG. 8 shows an illustration of an example of an overall light distribution that arises from a superimposition of individual light distributions.

FIG. 8 shows a schematic illustration of an overall light distribution 100 as a superimposition of individual light distributions 101 that are evenly distributed over the area, so that an even overall light distribution results. In this case, all the centers of the light distributions are arranged evenly and, like the centers 102a and 102b, for example, provided with a vertical distance a and a horizontal distance b in relation to one another. In addition, the expansion of all the light distributions is essentially of the same magnitude, like the expansion 103 of the light distribution with the center 102b, for example.

Figure 9:
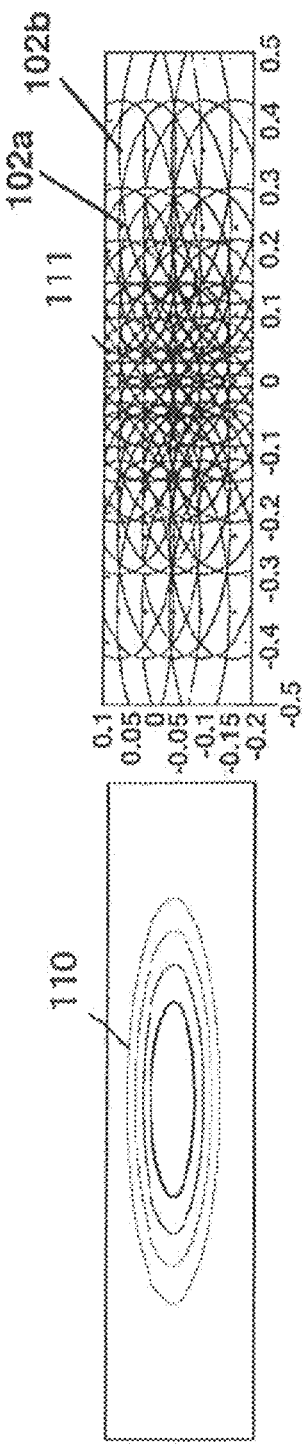
FIG. 9 shows an illustration of a further example of an overall light distribution that arises from a superimposition of individual light distributions.

FIG. 9 shows an overall light distribution 110, see the left-hand illustration, that is again compiled from individual light distributions 111, see the right-hand illustration, with the individual light distributions in the center being more sharply focused essentially in the horizontal direction than at the edge. In addition, the orientation of the individual light distributions 111 is altered such that, in comparison with the arrangement in FIG. 8, they are at a greater distance at the edge, for example represented using the centers 102a, than in the center, for example represented using the centers 102b, so that the overall light distribution 110 has a higher intensity in the center than at the edge.

FIG. 10 shows an overall light distribution 120, see the left-hand illustration, that is again compiled from a multiplicity of individual light distributions 121, see the right-hand illustration, there being sharper focusing for the overall light distribution 120 because the individual light distributions are oriented more strongly toward the center and are focused more sharply essentially in the horizontal direction.

FIG. 11 again shows an overall light distribution 130, see the left-hand illustration, that is again compiled on the basis of a multiplicity of individual light distributions 131, see the right-hand illustration, with sharp focusing in the center of the overall light distribution being the result.

Figure 12:
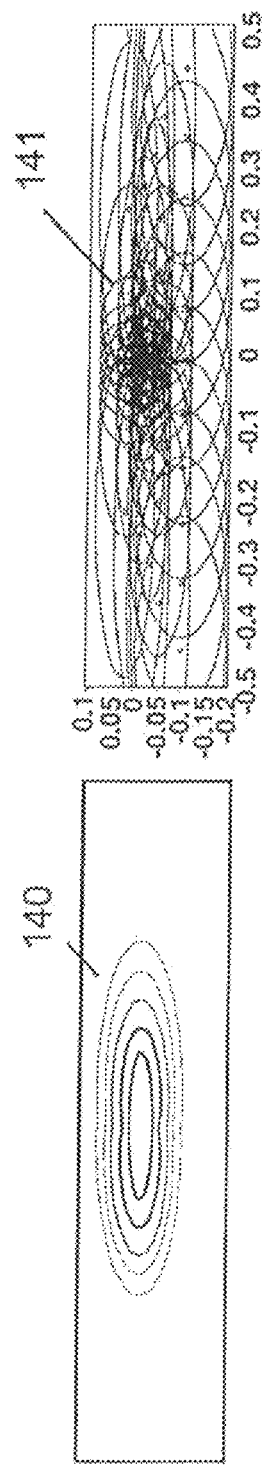
FIG. 12 shows an illustration of a further example of an overall light distribution that arises from a superimposition of individual light distributions.

FIG. 12 again shows an overall light distribution 140, see the left-hand illustration, that results on the basis of a multiplicity of individual light distributions 141, see the right-hand illustration, wherein the overall light distribution represents a light distribution for a high beam from a headlamp.

Figure 13:
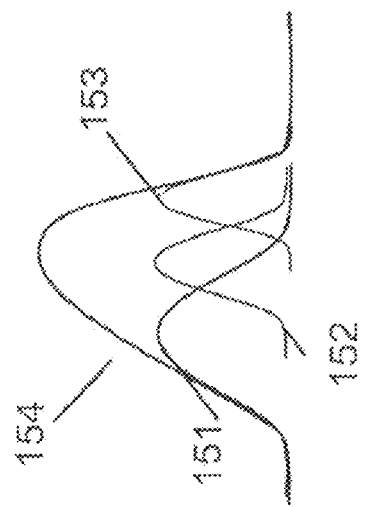
FIG. 13 shows an illustration to explain the production of a bright/dark boundary or an edge in the light distribution.

FIG. 13 shows a schematic illustration of how a bright/dark boundary or an edge, see the right-hand illustration, in which there is a higher intensity of light on the left-hand side than on the right-hand side, results from superimposition of, by way of example, three individual light distributions 151, 152, 153, see the left-hand illustration, to produce an overall light distribution 154, so that an edge in the overall light distribution can arise as a result of suitable choice of the individual light distributions, for example with ever narrower focusing toward the edge. For one edge, it is also possible for more than three light distributions to be superimposed. In this case, the characterization of the edge is dependent on the number of superimposed light distributions. Bright/dark boundaries can be used in the light distribution not just to produce a low beam but rather also to open at least one tunnel having reduced intensity for at least one vehicle ahead and/or oncoming vehicle, in order to avoid dazzling the at least one other vehicle. The tunnels can have their direction, distance and width altered with the movement of the, for example one, oncoming vehicle. In this case, the number of possible tunnels is dependent on the number of available individual light distributions.

Figure 14:
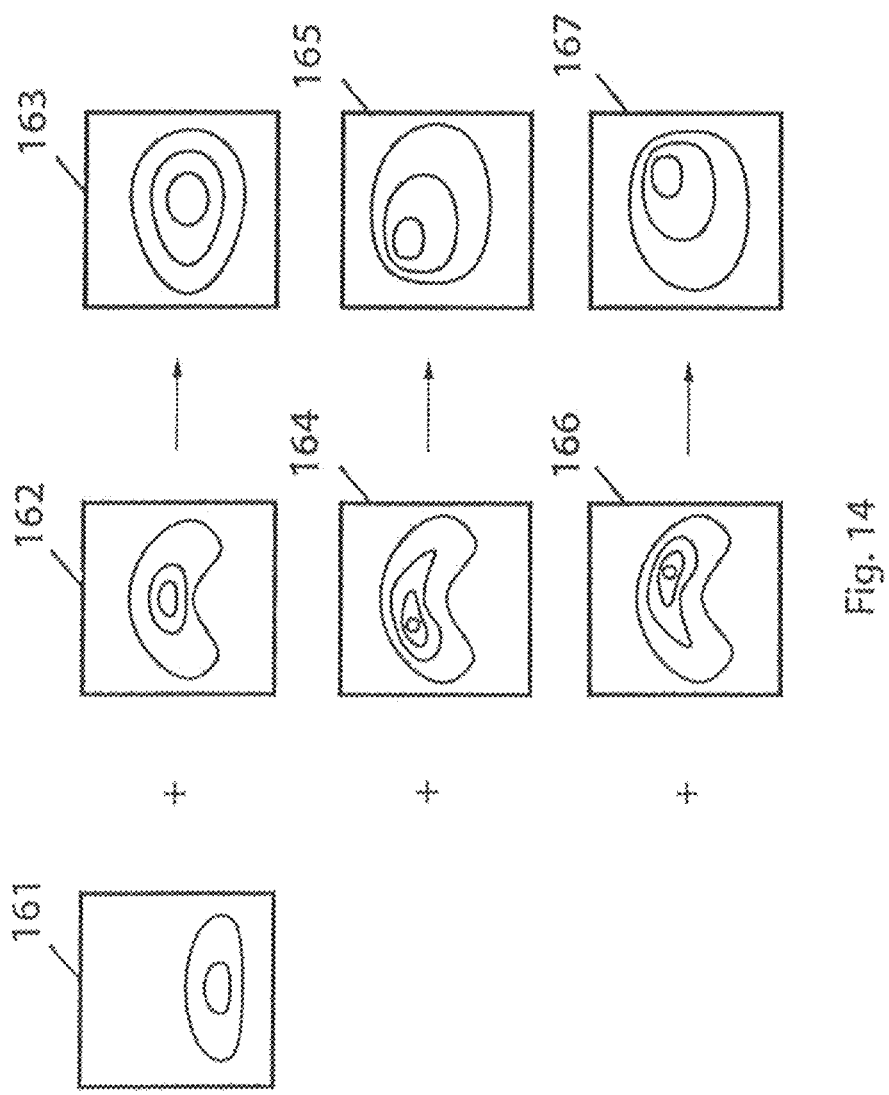
FIG. 14 shows an illustration to explain the production of an overall light distribution from a static basic light distribution and dynamically controllable light distributions.

FIG. 14 shows a schematic exemplary embodiment of a combination of static basic light distributions with dynamic controllable light distributions. In this case, the static basic light distribution 161 is added to a dynamic light distribution 162 to produce an overall light distribution 163. The structure of the basic light distribution, for example as an apron light distribution, is combined with a symmetrical dynamic light distribution 162 to produce an overall light distribution 163 for a straight road profile. Alternatively, the basic light distribution 161 can also have a dynamic light distribution 164 for a left-hand curve added to it, so that an overall light distribution 165 for a left-hand curve is the result. Alternatively, it is also possible for a dynamic light distribution 166 to be added to the basic light distribution 161, so that an overall light distribution 167 for a right-hand curve, for example, is the result.

In this case, the basic light distribution 161 at the dynamic light distributions 162, 164 or 166 are superimposed essentially throughout the solid angle range. Alternatively, the dynamic light distribution can also overlap or be combined with the basic light distribution only in a subrange, or alternatively, it is also possible for the basic light distribution 161 to be arranged in the solid angle range such that there is no resultant three-dimensional or solid-angle-like overlap with the dynamic light distributions 162, 164 or 166.

FIGS. 15 to 20 show exemplary arrangements of illuminants with appropriately arranged optical elements, such as primary optical systems and liquid lens arrangements for individually controlling the individual light distributions to produce an overall light distribution. In this case, the arrangement of the illuminants with their optical elements has provision for a respective matrix arrangement for the illuminants, the exemplary embodiments of FIGS. 15 to 20 containing a respective element that is used to produce a basic light distribution and, furthermore, a multiplicity of elements being provided that are used for producing dynamic light distributions.

Figure 15:
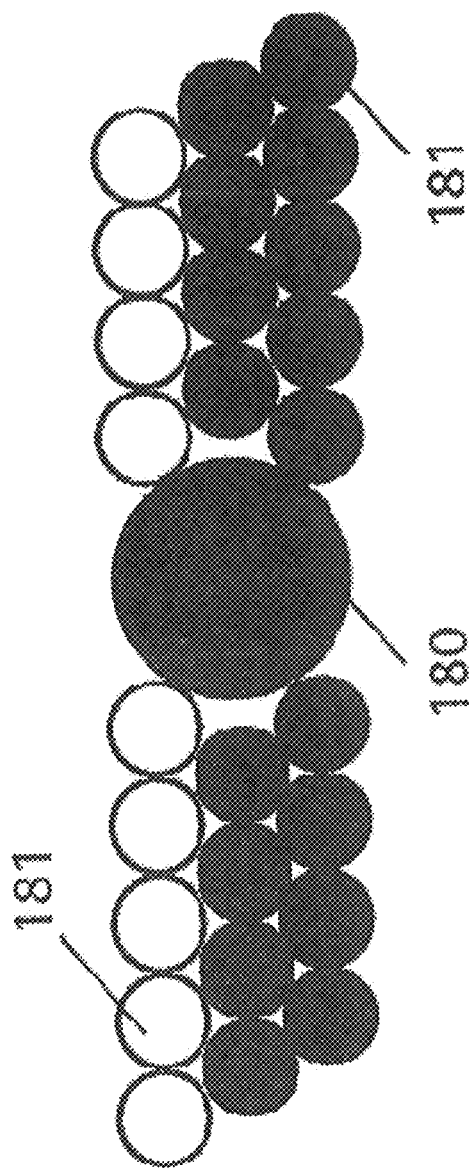
FIG. 15 shows an illustration of an example of an arrangement of illuminants.
Figure 16:
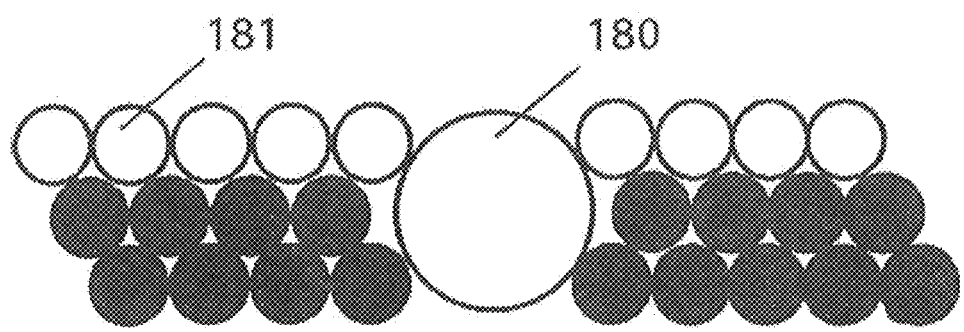
FIG. 16 shows an illustration of a further example of an arrangement of illuminants.
Figure 17:
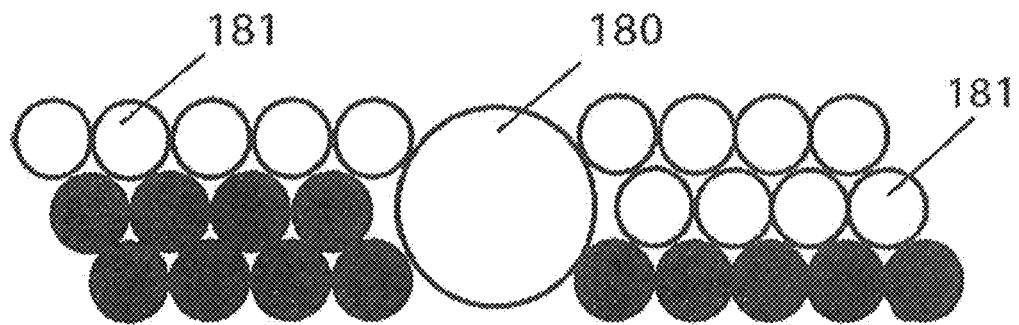
FIG. 17 shows an illustration of a further example of an arrangement of illuminants.
Figure 18:
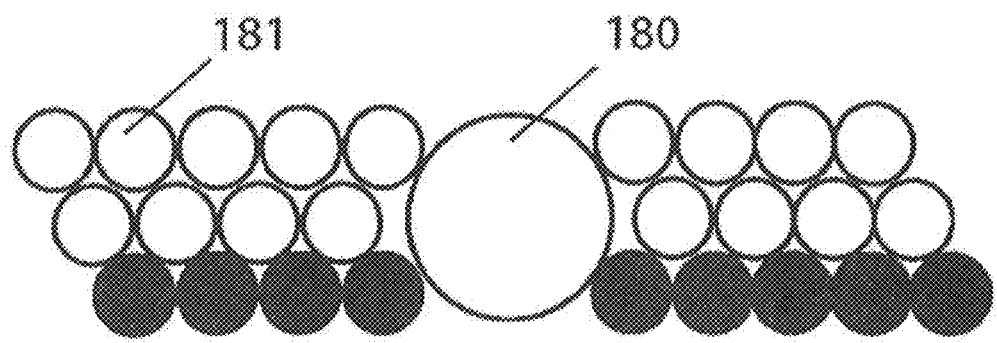
FIG. 18 shows an illustration of a further example of an arrangement of illuminants.
Figure 19:
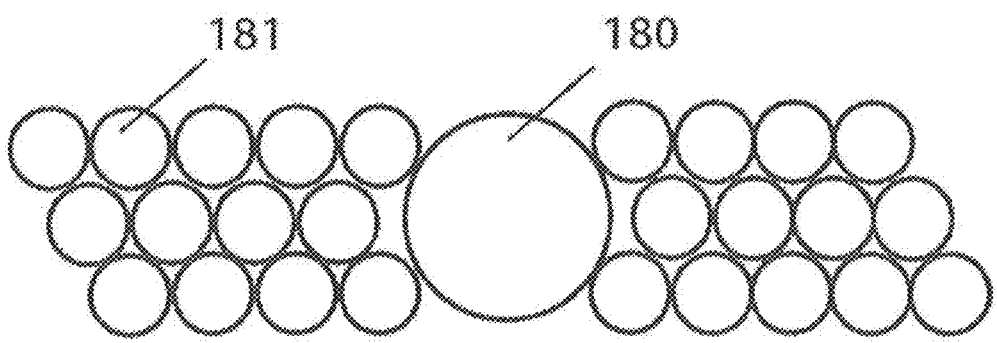
FIG. 19 shows an illustration of a further example of an arrangement of illuminants.

FIG. 15 shows an exemplary embodiment in which an element 180 is arranged centrally, a multiplicity of elements 181 being provided in three rows on both sides of the element 180. The element 180 is used to produce a static basic light distribution for the purpose of undertaking, by way of example, a static apron light distribution, the elements 181 arranged on both sides of the element 180 being used to produce a dynamic light distribution depending on actuation. In the exemplary embodiment of FIG. 15, only the elements 181 in the upper row on both sides of the element 180 are actuated, so that only these elements produce an individual light distribution in order to emit light. By way of example, the result is an overall light distribution for city lights, for example 900 lm. FIG. 16 shows a further exemplary embodiment in which the elements 181 in the topmost row are actuated, and also the element 180 for producing a low beam. The latter may be at 1800 lm, for example. The exemplary embodiment of FIG. 17 shows that the topmost row of the elements 181 and also the right-hand semi-row of the elements 181 and the element 180 are actuated, so that the result is a country road light of 2200 lm, for example. FIG. 18 shows an exemplary embodiment in which the two upper rows of the elements 181 and the element 180 are actuated to produce an overall light distribution, for example for a freeway journey at approximately 2600 lm. FIG. 19 shows an exemplary embodiment in which all of the elements 180 and 181 are actuated to produce the overall light distribution, for example for a high beam at approximately 3500 lm.

Figure 20:
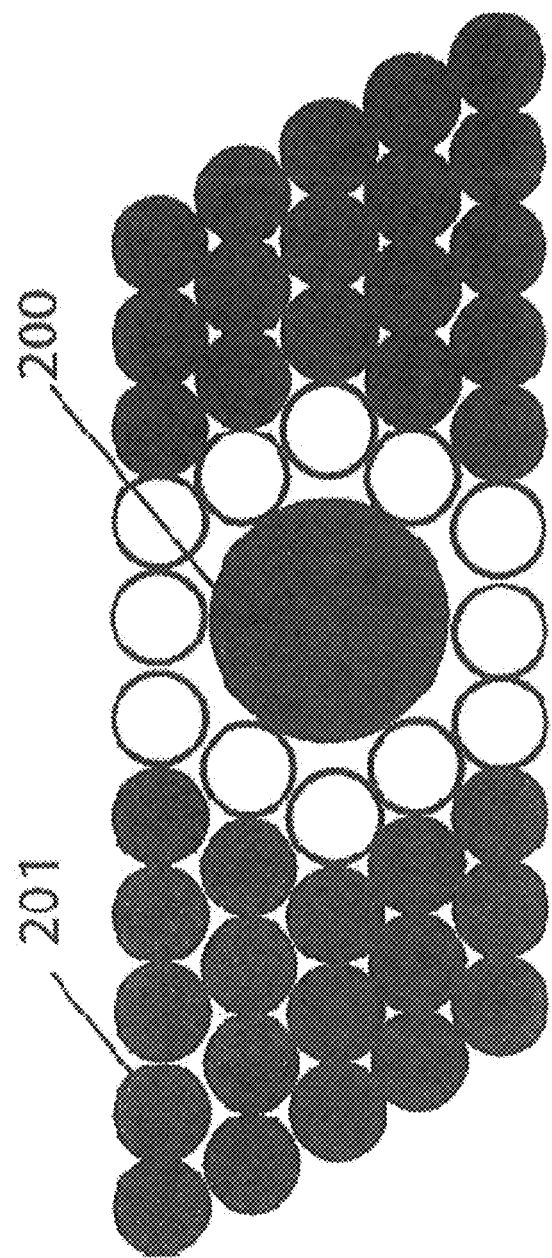
FIG. 20 shows an illustration of a further example of an arrangement of illuminants.

FIG. 20 shows a further exemplary embodiment of the arrangement of an element 200 for producing a basic light distribution and a multiplicity of elements 201, which are arranged in five rows both to the right and to the left of the element 200 and hexagonally around said element, for producing an overall light distribution, depending on the actuation, by superimposing the individual light distribution of the elements 200, 201.

In this case, the element 200 again undertakes a basic light distribution, for example for a static apron distribution, with the elements 201 producing dynamically selectable light distributions that are activable as situation-dependent light distributions.

In the exemplary embodiment of FIG. 20, only the 12 elements 201, which are arranged hexagonally around the element 200, are activated in order to bring about annular activation in order to produce a basic light distribution, for example for city lights or a low beam or daytime running lights.

Figure 21:
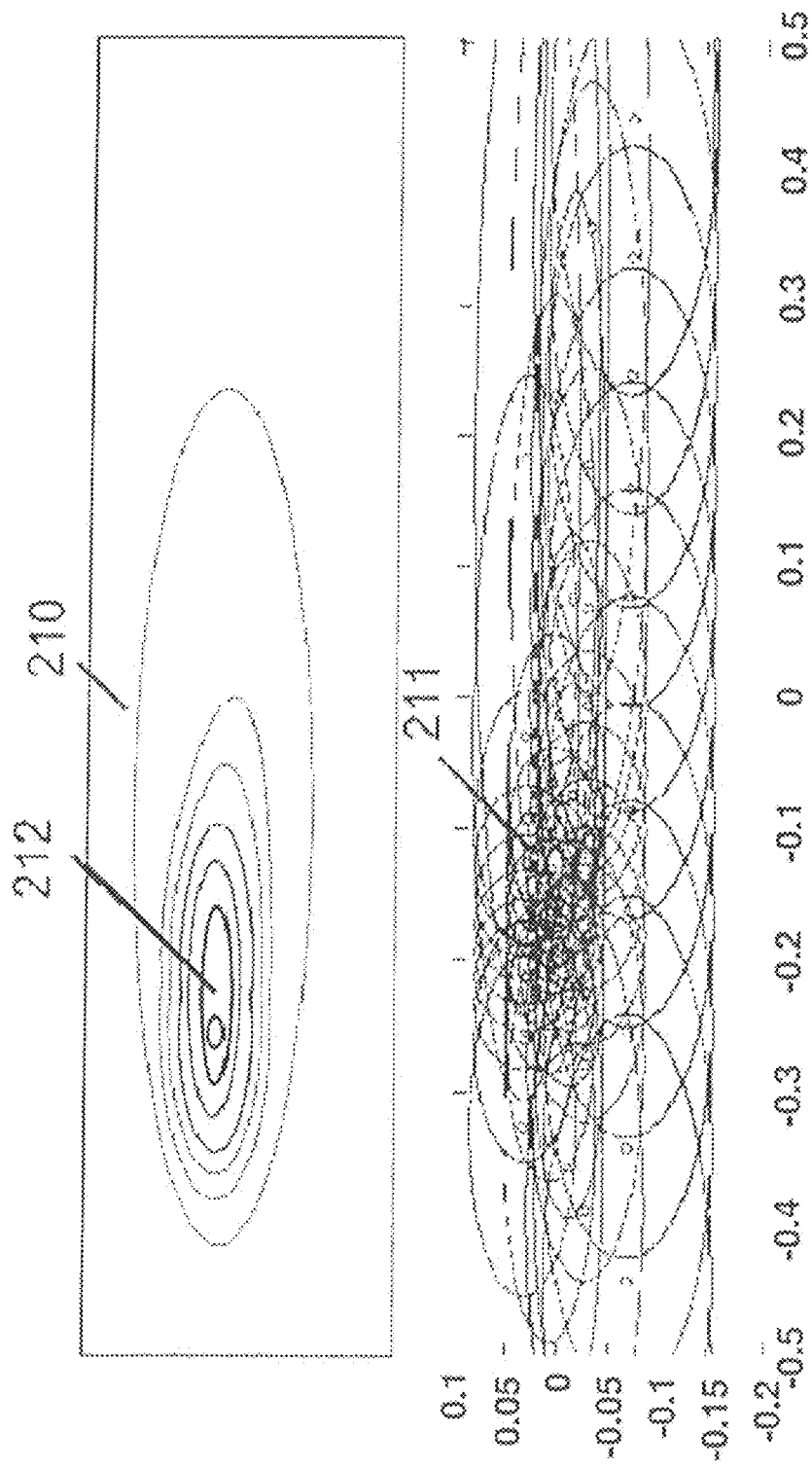
FIG. 21 shows an illustration of a further example of an overall light distribution that arises from a superimposition of individual light distributions.

FIG. 21 again shows an overall light distribution 210, see the left-hand illustration, that results on the basis of a multiplicity of individual light distributions 211, see the right-hand illustration, wherein the overall light distribution is a light distribution for a high beam from a headlamp when cornering with cornering lights. In this case, the overall light distribution in FIG. 21 is modified from the overall light distribution in FIG. 12 such that the bright spot of light 212 is deflected by a defined angle.

The method for calibrating a lighting apparatus is based on the use of a lighting apparatus that has a plurality of illuminants as light sources that each produce an individual light distribution. In this case, means for setting the direction of radiation of the individual light distribution from the illuminants and means for setting the focusing of the individual light distribution from the illuminants are provided. In addition, control means are provided for controlling the settings of the individual light distributions to produce a superimposed overall light distribution by dint of superimposition of the individual light distributions from at least single illuminants.

Figure 22:
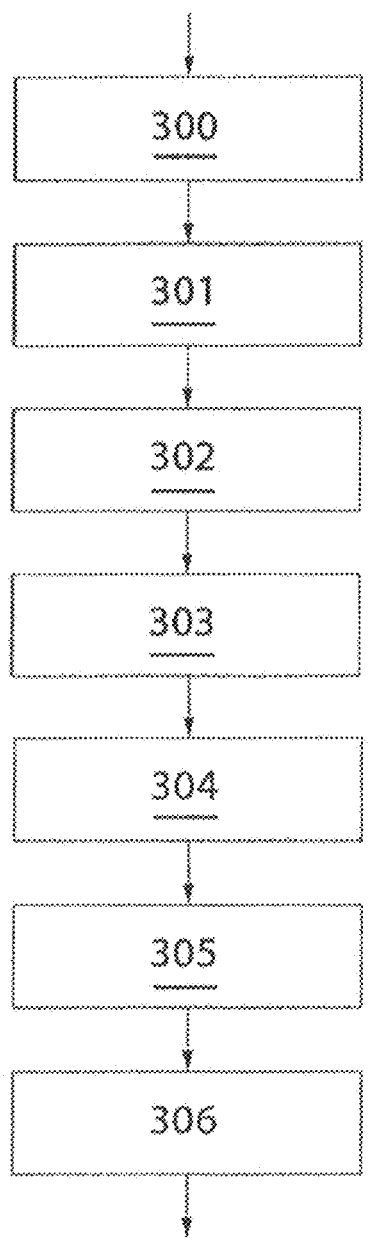
FIG. 22 shows a block diagram to explain the method according to the invention.

The method of calibration is performed, as shown in FIG. 22, such that a step 300 of the method involves the production of an essentially overlap-free distribution of the individual light distributions of at least single selected illuminants being performed. In a subsequent step 301, the light distribution for the selected illuminants is picked up by means of a sensor, for example by means of a camera. In a subsequent step 302, at least one characteristic of the picked-up individual light distributions of the selected illuminants is determined. This is followed, in a further step 303, by calibration of the lighting apparatus on the basis of a comparison of the at least one characteristic from different illuminants among one another and/or with prescribable setpoint data. Next, in step 304, the comparison is used to determine a discrepancy, and in step 305, the discrepancy is used to determine a correction value that is storable and, in accordance with step 306, is used to actuate the relevant illuminant.

In this case, the illuminant or the illuminants is/are in a form such that the intensity of the individual light distribution is adjustable, the respective intensity of the individual light distribution from the illuminants being controllable by the control means. Thus, besides the direction of radiation and/or the focusing, it is also possible to use the intensity in order to generate the overlap-free distribution of the individual light distributions.

In this case, the lighting apparatus is calibrated by setting the direction of radiation of the individual light distribution from at least one illuminant or all illuminants and/or the focusing of the individual light distribution from at least one illuminant and/or from all illuminants and/or the intensity of the individual light distribution of at least one illuminant or from all illuminants. Alternatively, the lighting apparatus can also be calibrated by setting the direction of radiation of the individual light distribution from at least one of the selected illuminants or all selected illuminants and/or the focusing of the individual light distribution of at least one of the selected illuminants and/or from all selected illuminants and/or the intensity of the individual light distribution from at least one of the selected illuminants or from all selected illuminants.

Figure 23:
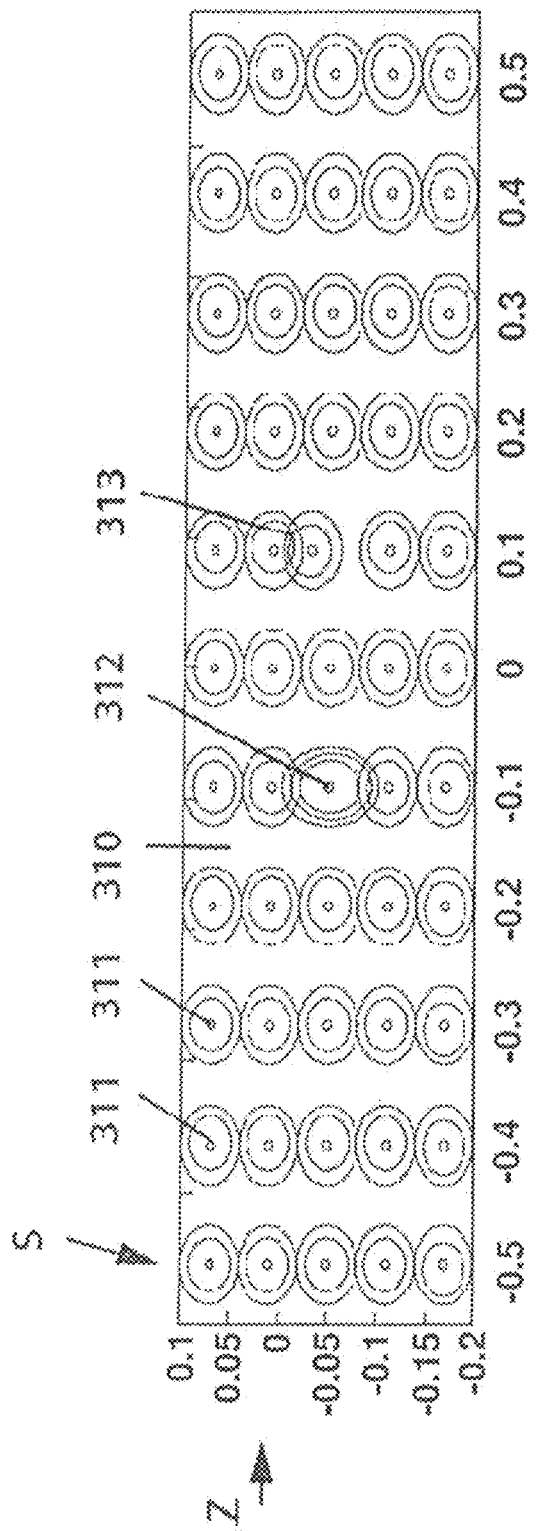
FIG. 23 shows an illustration of an overall light distribution that arises from a superimposition of individual light distributions, for calibrating the lighting apparatus.

FIG. 23 shows an overall light distribution 310 with a multiplicity of individual light distributions 311 for individual illuminants. In this case, the illuminants are arranged in rows z and columns s in a matrix arrangement, for example, so that the individual light distributions 311 likewise appear in a matrix arrangement of rows z and columns s.

It can be seen that almost all the individual light distributions are arranged regularly with an approximately round brightness profile that decreases from the center to the outside. The centers of the individual brightness profiles are arranged regularly in this case.

With two individual light distributions 312, 313 shown, on the other hand, there are discrepancies. Thus, the individual light distribution 312 has the focusing widened in the vertical direction or in the column direction and the individual light distribution 313 is shifted upward in the column direction as a round light distribution.

These discrepancies can be identified, for example by monitoring and comparing a characteristic of the individual light distribution.

In this case, the characteristic under consideration is a center or focus of an individual light distribution, as for the identification of the discrepancy in the light distribution 313.

It is also possible for the characteristic to be an expansion and/or a profile of the light distribution, as for the identification of the light distribution 312, for example.

In this case, the comparison is made as a comparison for centers and/or expansion parameters and/or profile parameters of light distributions that are ascertained from different illuminants. In this way, individual light distributions are thus compared with one another.

Alternatively or additionally, the comparison may be a comparison of centers and/or expansion parameters and/or profile parameters of light distributions that are compared with setpoint positions, setpoint expansions and/or setpoint profiles. As a result, a comparison is made not with one another but rather with prescribable values.

In this case, the calibration is advantageously effected by virtue of the production of an essentially overlap-free distribution of the individual light distributions being performed over an area in front of the vehicle. The area is advantageously an at least essentially even area that has a horizontal or vertical profile, in particular. This avoids distortions. The area may also be a selected area or is a subregion of a selected area in which the operation of the headlamp is essentially unimpaired and/or the driver of the vehicle and/or other road users are not disturbed or influenced. It is thus advantageous if the area is not visible to the driver of the vehicle. As a result, the calibration also does not produce any irritation for the driver.

According to the invention, the method for calibration can be performed in one step, for example during the production, assembly or commissioning of the lighting apparatus.

Alternatively, the method for calibration can also be performed cyclically in multiple calibration cycles. In this case, the method for calibration can be performed such that only a portion of the illuminants of the lighting apparatus are calibrated in a calibration cycle, different calibration cycles involving different portions of the illuminants being calibrated. In this case, after a complete pass through the calibration cycles, essentially all illuminants can advantageously be calibrated.

In this case, the selected illuminants for calibration can be selected such that they are currently not used to produce a light distribution that is needed on account of the situation, or such illuminants as are also used for producing the required light distribution are used but they are at least intermittently replaced by other illuminants. This may be a light distribution that is required on account of traffic, on account of surroundings, on account of settings or on account of other parameters.

In a further alternative, it is also possible if only one individual light distribution for an illuminant at a time is calibrated in a calibration cycle. In this case, this can be performed in successive cycles, so that after the performance of all cycles, all illuminants have been calibrated.

FIG. 23 shows an overall light distribution on the basis of a multiplicity of individual light distributions that represents production of the overlap-free distribution of the individual light distributions. In this case, the individual light distribution can be effected in at least one of various settings of the illuminants. This setting can be set as a setting for a central position, a, in particular extreme, swivel position, a, in particular extreme, focusing and/or an, in particular extreme, expansion.

Instead of a static setting, it is in this case alternatively possible to make a dynamic setting for the individual light distribution or the light distributions. This can be set as swiveling and/or circling and/or expansion and contraction.

When the calibration of a lighting apparatus of a motor vehicle is performed, the calibration can be performed when the motor vehicle is at a standstill. It is also possible for the calibration to be performed during a driving situation of the motor vehicle while traveling.

According to the invention, one exemplary embodiment may also have provision for calibration to involve the a pattern being produced and/or projected from the individual light distributions, in which the individual light distributions do not overlap.

According to the invention, one exemplary embodiment may also have provision for calibration to involve at least one second pattern being produced and/or projected from the individual light distributions, in which the light distributions do not overlap.

Optionally, the first pattern and/or the second pattern could also be in a form such that the individual light distributions also overlap at least in regions.

In such a case, the area may be small in comparison with the total area of the light distribution. This is distinguished particularly by low brightness. This nevertheless allows optical distinguishability of the individual light distributions.

Optionally, a distribution of the individual light distributions or a pattern from individual light distributions of at least some selected illuminants is produced in which the individual light distributions are mapped in optically separable form. In this case, the shape of the individual light distributions is mapped completely in line with the fuzziness brought about by the property of the light. In addition, characteristics of the individual light distributions and/or demarcation regions between the light distributions are associable.

It is particularly preferred if the second pattern is a complementary pattern for the first pattern. This maximizes the contrast on changing from the first pattern to the second pattern, and vice versa.

It is also particularly advantageous if a change between the first pattern and the second pattern and vice versa is effected at a prescribable frequency.

It is also expedient if the first pattern and/or the second pattern is a regular pattern.

To implement the actuation of the individual light distributions of some light sources, in one advantageous embodiment it is possible for the light sources to be activated and deactivated specifically. The shape, intensity and orientation of the individual light distributions are not actuable in one exemplary embodiment in this case. Optionally, the shape, intensity and/or orientation can also be actuated, however.

In one advantageous embodiment, the shape of some light distributions may be the same as that of other individual light distributions, or every single light distribution is the same as any other individual light distribution.

The arrangement of the light distributions is advantageously and optionally regular. This results in a regular pattern as a setpoint pattern. Alternatively, it is also possible for an irregular pattern to be produced as a setpoint pattern by the production of the individual light distributions. In particular, this is advantageous if the orientation of the light is controllable and the individual light distribution is produced/projected into a region that is invisible to the driver. In this case, an arrangement that corresponds to the shape and size of the invisible region is also advantageous.

Optionally, means for smoothing the edges of the respective individual light distribution can be used for producing the light distributions in the headlamp. A rectangular light distribution having sharp edges, as an example, has the disadvantage that a homogeneous overall light distribution, particularly at the edges, can be produced only with difficulty. The simplest way of producing a fuzziness is achieved through fuzzy focusing. A disadvantage in this context, however, is that even all the desired edges such as the light/dark boundary of the light distribution have a washed-out effect.

A further possibility is therefore also to use a larger number of light sources. This results in higher costs, however. Besides these two options, the individual light distribution is, in one embodiment, produced specifically by virtue of the basic light distribution of the individual light source being duplicated and projected with a slight offset. This can be seen in FIG. 24.

Figure 24:
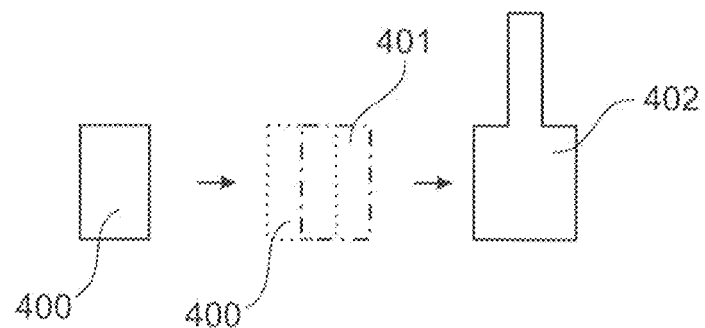
FIG. 24 shows an illustration of a light distribution.

FIG. 24 reveals the basic light distribution 400 used. This basic light distribution is duplicated by an optical element as light distribution 401 and projected in a displaced manner.

In the resultant light distribution 402, the two light distributions 400 and 401 overlap in the middle region and add up in the brightness, so that a light distribution whose brightness rises and falls again when viewed from left to right, that is to say is approximately Gaussian, emerges as the individual resultant light distribution 402.

Figure 25:
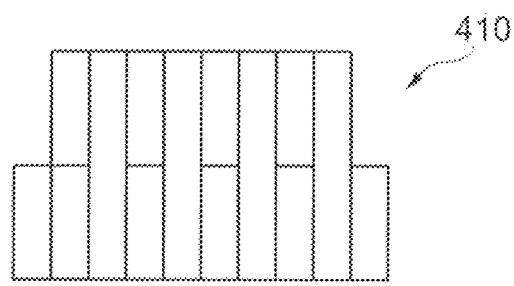
FIG. 25 shows an illustration of an overall light distribution.

FIG. 25 shows an overlaid overall light distribution 410 produced from the light distributions in FIG. 24, wherein the individual light distributions 402 produce an overlaid overall light distribution 410 by being adjusted and used such that they overlap with a slight lateral offset. As a result, the falling ends or edges add up and a homogeneous overall light distribution 410 emerges.

Figure 26:
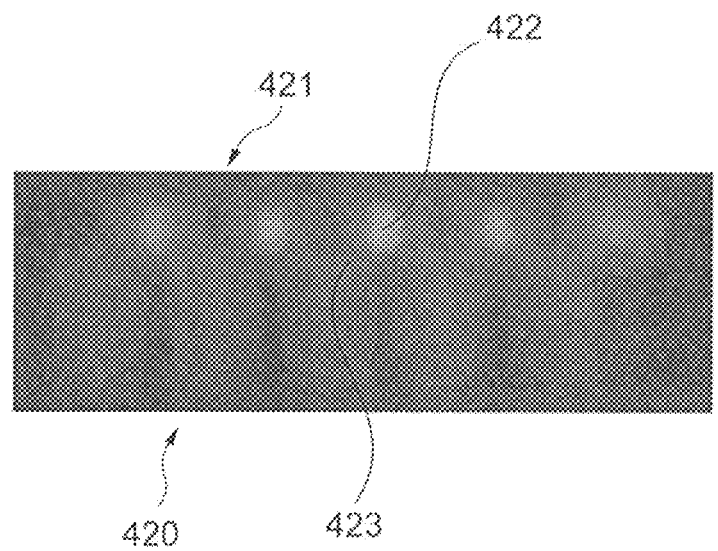
FIG. 26 shows an illustration of an overall light distribution.

FIG. 26 shows, in contrast, a photograph of an overlap-free calibration light distribution 420 that is used for the calibration process. To this end, a calibration light distribution 420 is produced in which the individual light distributions 400, 402 do not overlap. This produces a pattern 421 that essentially consists of light, illuminated areas 422 and of dark, unilluminated areas 423, which are arranged next to one another and repeat in line with the periodicity or the pattern 421. In particular, the pattern 421 produced is essentially a checkerboard pattern comprising individual light distributions 402.

For this, the light source adjacent to a switched-on light source is switched off and the light source adjacent to a switched-off light source is switched on. This applies both to horizontally and to vertically adjacent light sources. As a result, a pattern emerges that provides light sources that are always alternately switched on and switched off in a horizontal direction and in a lateral direction alternately.

To produce a complementary pattern thereto, all light sources that were previously switched on are switched off and all the light sources that were switched off are switched on. This results in an overall light distribution in which previously light areas are dark and in which previously dark areas are light. The resultant overall light distribution is therefore complimentary to the first overall light distribution.

In particular, the light sources can be switched on and off in turn over time. This allows all light sources to be able to be taken into consideration for the calibration.

In a further preferred embodiment, it is also possible for just one selected mapping region of a headlamp to be used. This selected mapping region may be defined by a defined number or group of light sources, for example, such as by an inner or middle mapping region of the headlamp. This middle mapping region can take into consideration the middle 10 light sources of a headlamp, for example, which are actuated in order to produce the light distribution for the calibration. It is also possible for more or fewer than 10 light sources to be actuated. This approach of actuating only a limited number of light sources for the calibration has the advantage that any distortions conditional upon a forward optical system may have only a minor effect.

In a further exemplary embodiment, it may also be advantageous if only light sources in a lower region of a headlamp are used in order to be actuated for the calibration. This approach could reduce or avoid dazzling. This procedure is advantageous particularly when the orientation of the whole headlamp needs to be ascertained.

The sensor portrayal of the overall light distribution of the selected illuminants is recorded by means of a sensor. In a first embodiment, the pattern of the brightness distribution is picked up in this case. Ideally, this brightness distribution is projected onto a wall for this purpose. This has the advantage that a distortion-free distribution is available. Alternatively, the light distribution is projected onto the road or the ground that is on hand. To equalize the portrayal, it may then be possible to optionally perform an equalization transformation of the image of the portrayal. In this case, the distance of the headlamp from the road at at least three locations in the projected brightness distribution is taken into consideration.

A further embodiment relates to the simultaneous calibration of all illuminants. This method is made possible by a clever approach. To this end, the images of the complementary checkerboard patterns are deducted from one another. The difference produced is a contrast image 430, see FIG. 27.

In this case, the regions in which there is no difference between the two checkerboard patterns are represented as grey regions 432. The white regions 433 show the positive values of the computed difference and the black regions 434 show the negative ones, in each case in decreasing intensity the nearer they approach zero and accordingly become grey.

Figure 28:
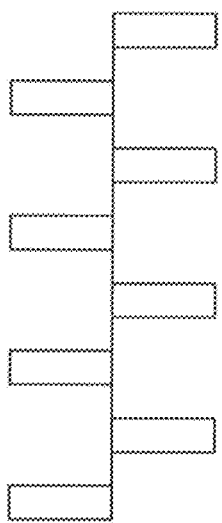
FIG. 28 shows an illustration of a resultant distribution.
Figure 27:
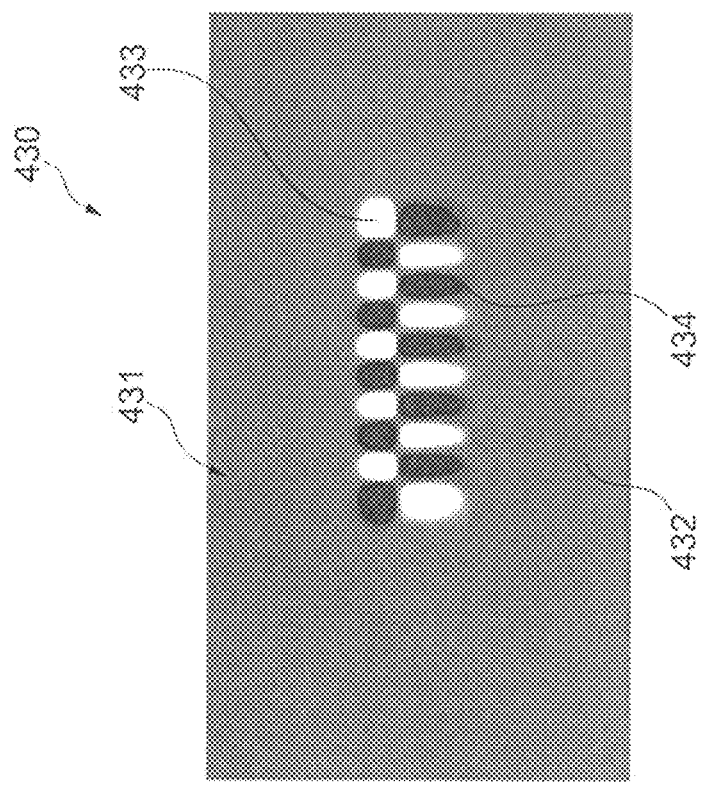
FIG. 27 shows an illustration of a processed overall light distribution.

The white regions 433 correspond to the light regions in the first checkerboard pattern and the black regions 434 correspond to the light regions of the second complementary checkerboard pattern. Regions in which the individual light distributions would overlap in the overall light distribution, in which all illuminants are activated simultaneously, are represented in grey. These are present at the same location in both images of the complementary light distributions and therefore cancel one another out in the difference formation. The difference corresponds in terms of value, to the background 432 and is represented in grey. On account of the optical system of the headlamp, these regions of overlap are very small and can be seen as narrow lines in FIG. 28. FIG. 27 schematically shows the brightnesses represented in FIG. 28 in section for a row.

Figure 30:
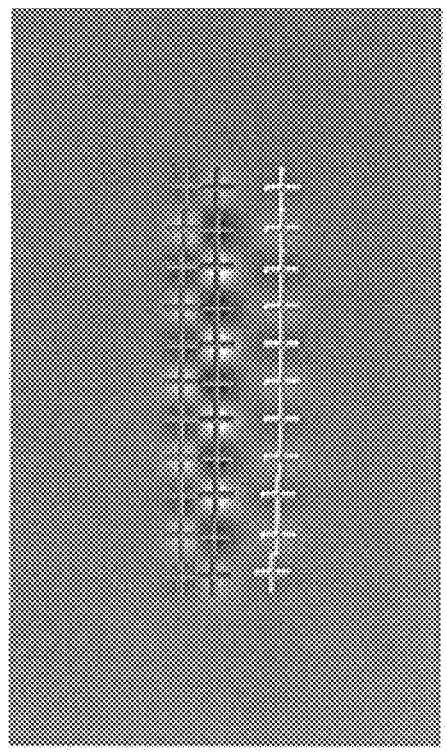
FIG. 30 shows an illustration of an overall light distribution with identified maxima and minima.
Figure 29:
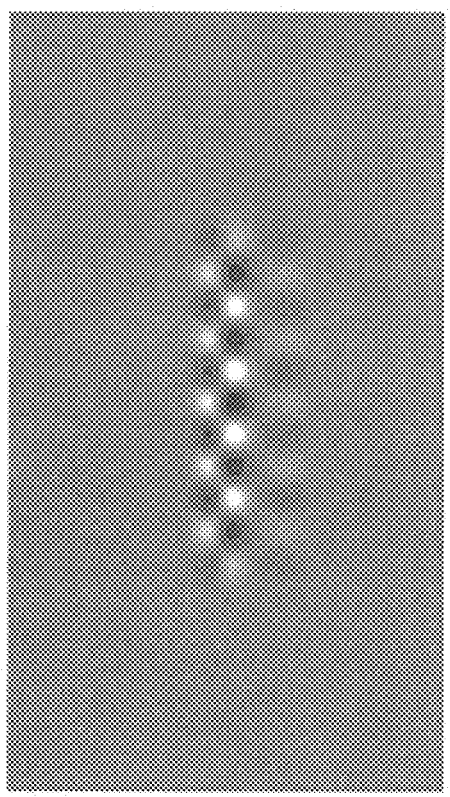
FIG. 29 shows an illustration of an overall light distribution.

Calibration can involve multiple characteristics being ascertained in the recorded checkerboard light distribution or on the basis of the individual light distributions of the illuminants visualized in the contrast image. To this end, characteristic points in the overall light distribution produced for the calibration are first of all identified in the present embodiment. In particular, these are the corners in the overall light distribution. These characteristic points are detected by using technical tools: first of all, the contrast image or the data record, on which the representation is based, for at least two overall light distributions produced for the calibration is used. This makes the method more robust and means that it can mask out textured backgrounds. On the contrast image, it is subsequently necessary to ascertain the characteristic points of the overall light distribution. In a first embodiment, this can be effected using a filter that identifies corners or crossing points. FIG. 29 shows a mapping of the probability of the presence of a corner or of a crossing point in the value based on its position on the axes. On such a distribution produced by the filter, see FIG. 29, the extremes are then sought, see FIG. 30, each of which is denoted by a cross. Each extreme is assigned a row of filtered corners or crossing points, which produces three rows with corners for the respective rows (upper edge, middle line, lower edge) of the individual light distributions that form the overall light distribution. The characteristic points can also be ascertained directly in the image of the overall light distribution specifically produced for the calibration, however. This is likewise possible with a corner filter. Since a corner filter reacts more strongly to corners of 4 adjoining areas, however, that is to say has a higher probability of being able to identify and locate a corner, it is advantageous to additionally or alternatively use other methods. In addition, it is advantageous to connect a background detection unit upstream and to compensate the structures that are independent of the illumination of the headlamp.

The overall light distribution or a contrast image, or a checkerboard light distribution, can thus, as described above, be evaluated using a corner filter, which is also known as a Harris corner detector, for example. It is also possible to effect an extreme search for the possible corners or crossing points that identifies the characteristic points.

Alternatively, it is also possible for an edge filter to be used. Linear equations are formulated from the detected edges. Said equations are chosen such that the error in relation to the detected edges or a probability distribution for edges is minimized. The intersections on the straight lines are the corners found and serve as characteristic points. This is particularly advantageous if characteristic points are sought not in the contrast image but rather directly in the overall light distribution, or no explicit characteristic points can be found using a corner filter for another reason. Therefore, a combination of corner and edge filters is also advantageous.

In a further embodiment according to the invention, a model of the greyscale values can be generated from the contrast image, such as a checkerboard light distribution. This involves a mathematical approximation being used that has a slight error, that is to say a slight difference, in relation to the mapping. The values computed from the difference image or the image of the overall light distribution produced for calibration are interpreted as a 3D point cloud and serve as a basis for the subsequent regression.

Figure 34:
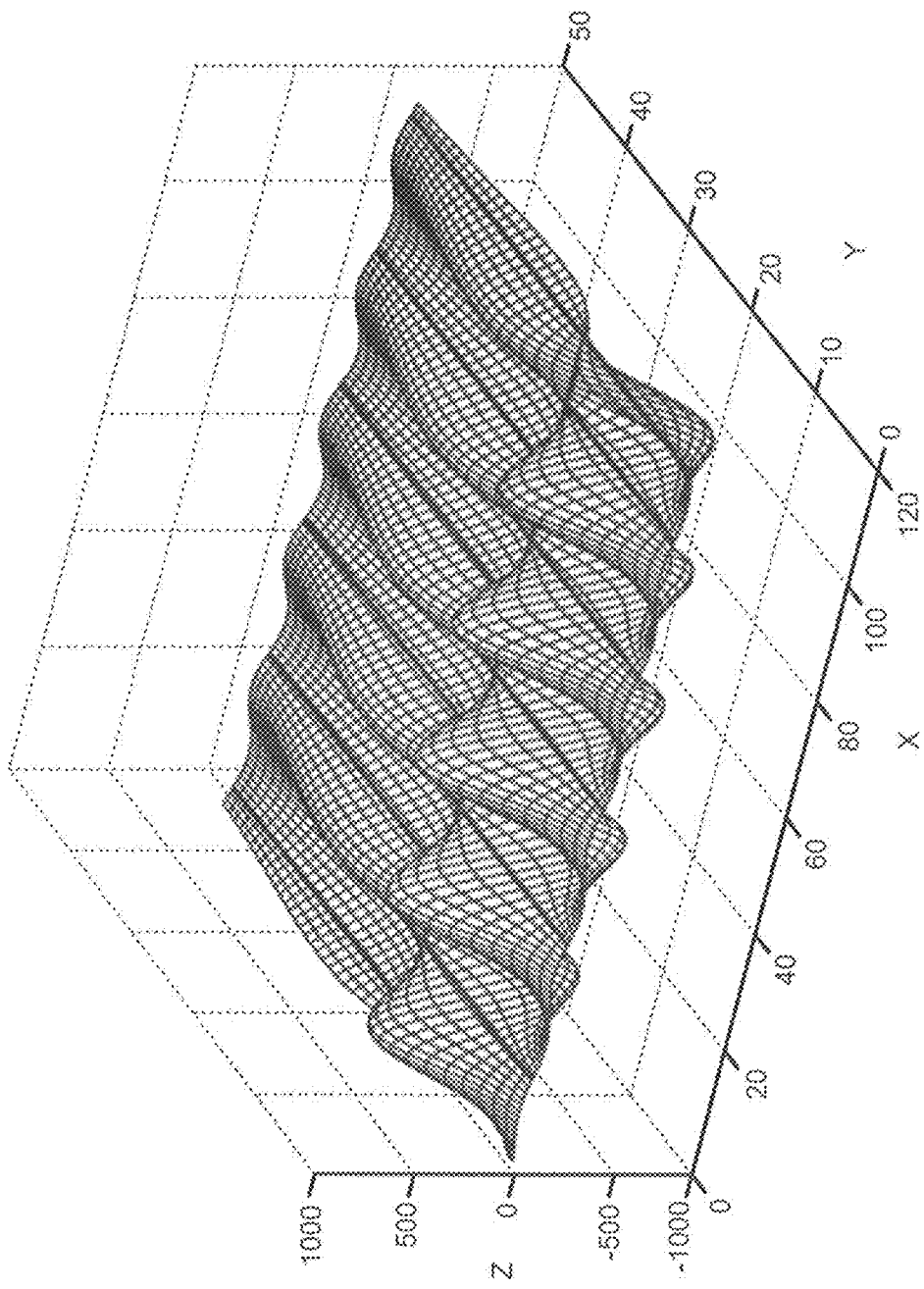
FIG. 34 shows a three-dimensional illustration of an approximation to a contrast image.

The resultant two-dimensional function is an accurate approximation to the contrast image, see FIG. 34. On the basis of selected properties of the 2D model, it is possible to detect characteristic points in the mapping of the original light distribution produced for the calibration. Zero crossings in this case represent the boundaries of the individual light distributions of the individual illuminants. On the basis of the intersections of the boundaries, it is possible to find the corners.

Figure 31:
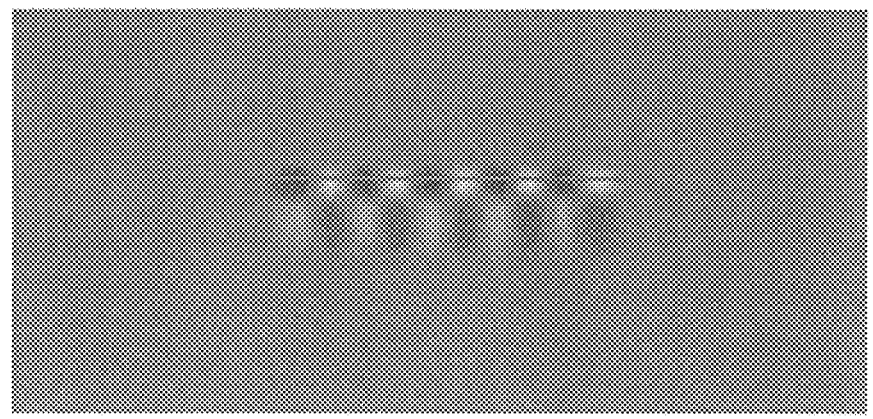
FIG. 31 shows an illustration of an overall light distribution with a line along which maxima and minima evaluation takes place.
Figure 32:
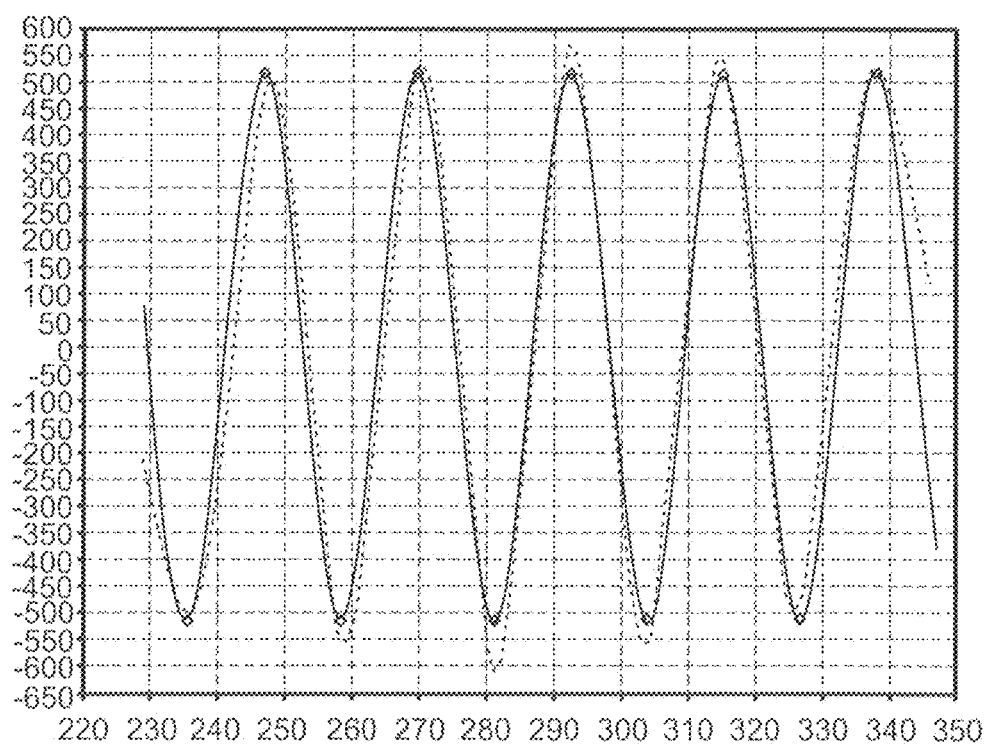
FIG. 32 shows a curve with values of the brightness as function of the location along the line in FIG. 31.

To create the 2D model, the procedure used is as follows, for example: A mathematical formulation of a two-dimensional function is fitted or matched to the greyscale values of the contrast image. This is also possible separately for the respective x and y axes and represented in FIGS. 31 and 32 using an example of the x axis. Alternatively, the overall function can be evaluated as can be seen in FIG. 34. In this case, explicit characteristic points from the pattern are then determined whose setpoint angle can be associated. That is to say, for example, a zero crossing or a maximum or a minimum.

Figure 33:
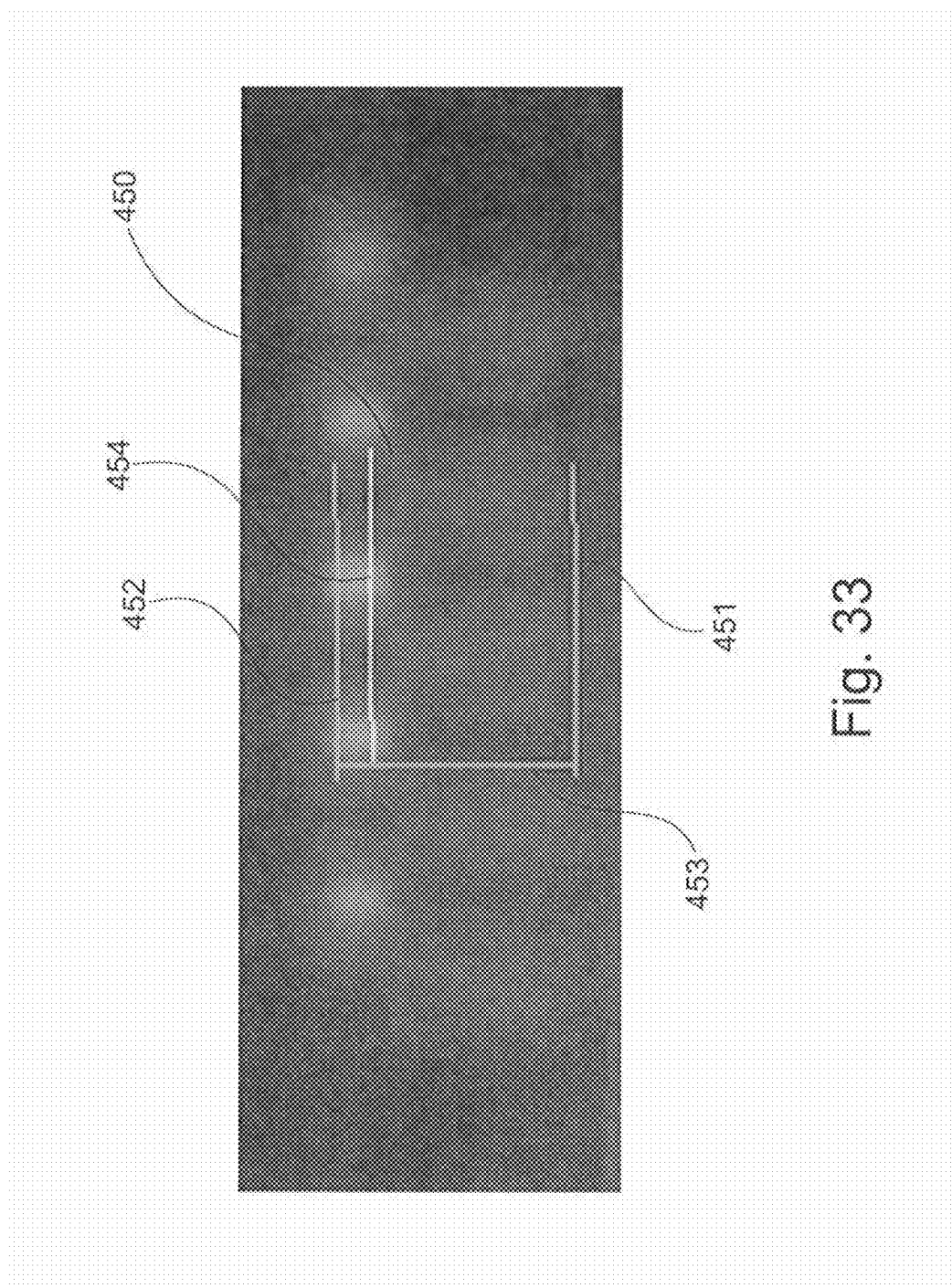
FIG. 33 shows an illustration of an overall light distribution with identified characteristic points.

For the purpose of calibration, the characteristic points found can be associated with the light distribution in the event of their having been detected in the contrast image, see the crosses in FIG. 33.

On the basis of the distance of the characteristic points from one another, it is possible to determine the distance from the wall/road, which is a further characteristic for calibration. The distance ascertained in this case can be used as a starting value for the subsequent optimization, for example.

The setpoint angles are ascertained by formulating a nonlinear optimization problem, for example. On the basis of distance, error in horizontal angle and error in the vertical angle, the vehicle geometry is taken into consideration in order to ascertain an image point. The setpoint position, setpoint greyscale value, is in this case determined on the basis of the vehicle geometry, that is to say on the basis of the position of the headlamp and the camera.

Every ascertained image point corresponds to one of the detected characteristic points. The distances between corresponding points are minimized.

This approach is used particularly for calibrating the angular error of the headlamp. In this case, the meanings in FIG. 33 are as follows:

Crosses 450: Detected characteristic points of the light distribution

Lower line 451: Baseline of the wall on the basis of the estimated distance

Upper line 452: 0° line of the vertical angle in relation to the estimated distance Vertical line 453: 0° line of the horizontal angle in relation to the estimated distance Horizontal line 454: Setpoint line of the calibration angle in relation to the estimated distance. The start and end of the line describe the horizontal setpoint angles for the first and last characteristic points.

The distance between the crosses 450 and the horizontal line 454 graphically represents the calibration angle error.

In this case, it is also possible for the characteristics of illuminants to be compared among one another:

An evaluation of the number of points, the position of the maxima, the intensity and/or the distances of the corners can be performed.

On the basis of the number of characteristic points, it is possible to detect how many light sources are active. In this way, it is possible to ascertain failure of one light source. In addition, the amplitude of the function can be used to ascertain the brightness of the light source, and discrepancies as a result of soiling, for example, can be established. In addition, the regularity of the distances can be examined. In this way, it would also be possible to identify a fault or melting of dispersing or converging lenses of the headlamp.

It is advantageous to take several pictures and to ascertain characteristic points therein. In this way, the accuracy can be increased by means of statistical evaluations.

LIST OF REFERENCE SYMBOLS

1 Overall light distribution
2 Individual light distribution
3 Illuminant
11 Overall light distribution
12 Individual light distribution
13 Illuminant
20 Lighting apparatus
21 Illuminant
22 Liquid lens element
23 Primary optical element
24 Light distribution
25 Light distribution
26 Individual light distribution
27 Control means
30 Lighting apparatus
31 Illuminant
32 Primary optical system
33 Liquid lens arrangement
34 Control means
35 Lighting apparatus
41 Illuminant
42 Primary optical system
43 Liquid lens arrangement
44 Control means
45 Sensor data
46 Driver input
47 Set of light distributions
48 Computation code
49 Block
50 Block
51 Block
60 Liquid lens arrangement
61 Wall
62 Fluid
63 Fluid
64 Housing
65 Plate
66 Electrode
67 Electrode
68 Equivalent circuit diagram
69 Equivalent circuit diagram
70 Equivalent circuit diagram
80 Liquid lens arrangement
81 Fluid
82 Fluid 100 Overall light distribution
101 Individual light distribution
110 Overall light distribution
111 Individual light distribution
120 Overall light distribution
121 Individual light distribution
130 Overall light distribution
131 Individual light distribution
140 Overall light distribution
141 Individual light distribution
150 Bright/dark boundary
151 Individual light distribution
152 Individual light distribution
153 Individual light distribution
154 Overall light distribution
161 Basic light distribution
162 Dynamic light distribution
163 Overall light distribution
164 Dynamic light distribution
165 Overall light distribution
166 Dynamic light distribution
167 Overall light distribution
180 Element
181 Element
200 Element
201 Element
210 Overall light distribution
211 Individual light distribution
212 Spot of light
300 Step
301 Step
302 Step
303 Step
304 Step
305 Step
306 Step
310 Overall light distribution
311 Individual light distribution
312 Individual light distribution
313 Individual light distribution
400 Light distribution
401 Light distribution
402 Resultant light distribution
410 Overall light distribution
420 Calibration distribution
421 Pattern
422 Light area
423 Dark area
430 Difference image
431 Contrast image
432 Grey background
433 White region
434 Black region
450 Cross
451 Line
452 Line
453 Line
454 Line

The invention claimed is:

1. A method for calibrating a lighting apparatus, the method comprising:
providing a lighting apparatus having a plurality of illuminants and a control means for individually controlling the settings of each illuminant of the plurality of illuminants,
producing or projecting at least one pattern of light distribution from at least one selected illuminant of the plurality of illuminants having an individual light distribution, wherein said individual light distribution is overlap-free,
using a sensor to detect the pattern of light distribution,
determining at least one characteristic of each of the individual light distributions of the at least one selected illuminant,
calibrating the lighting apparatus on the basis of a comparison of the at least one pattern of light distribution with a predefined setpoint data.

2. The method according to claim 1, wherein the calibrating involves multiple illuminants producing or projecting a first and a second pattern from the individual light distribution of each of the multiple illuminants, in which the individual light distributions at least essentially do not overlap.

3. The method according to claim 2, wherein the second pattern is a complementary pattern for the first pattern.

4. The method according to claim 2, wherein a change between the first pattern and the second pattern and vice versa is effected at a prescribable frequency.

5. The method according to claim 2, wherein the first pattern and/or the second pattern is a regular pattern.

6. A control apparatus, such as a controller, for carrying out the method according to claim 1.

* * * * *